(12) United States Patent
Justice et al.

(10) Patent No.: US 8,323,601 B2
(45) Date of Patent: Dec. 4, 2012

(54) CATALYSTS FOR LEAN BURN ENGINES

(75) Inventors: Rachelle Justice, Coralville, IA (US); Rajashekharam Malyala, Camarillo, CA (US); Svetlana Iretskaya, Paris (FR); Dylan Trandal, Ventura, CA (US); Dien To, Dallas, TX (US); Jason Pless, Ventura, CA (US); Stephen Golden, Santa Barbara, CA (US); Jiho Yoo, Irvine, CA (US)

(73) Assignees: Catalytic Solutions, Inc., Ventura, CA (US); ECS Holdings, Inc., Ventura, CA (US)

( * ) Notice: Subject to any disclaimer, the term of this patent is extended or adjusted under 35 U.S.C. 154(b) by 30 days.

(21) Appl. No.: 12/784,140

(22) Filed: May 20, 2010

(65) Prior Publication Data

US 2010/0316547 A1 Dec. 16, 2010

Related U.S. Application Data

(60) Provisional application No. 61/180,122, filed on May 20, 2009.

(51) Int. Cl.
| | |
|---|---|
| B01D 53/56 | (2006.01) |
| B01D 53/94 | (2006.01) |
| B01J 8/02 | (2006.01) |
| B01J 8/00 | (2006.01) |
| C01B 21/00 | (2006.01) |
| C01B 23/00 | (2006.01) |
| C01B 25/00 | (2006.01) |
| C01B 31/00 | (2006.01) |
| C01B 33/00 | (2006.01) |
| C01B 35/00 | (2006.01) |
| C01B 31/18 | (2006.01) |
| C01G 28/00 | (2006.01) |
| C01G 30/00 | (2006.01) |

(52) U.S. Cl. .................. 423/213.5; 423/247
(58) Field of Classification Search .............. 423/213.2, 423/213.5, 247, 598, 594.9, 594.12; 502/349–352, 502/339, 325
See application file for complete search history.

(56) References Cited

U.S. PATENT DOCUMENTS 4,970,182 A * 11/1990 Shirasaki ............... 501/134
5,190,907 A * 3/1993 Sharygin et al. ......... 502/400
(Continued)

OTHER PUBLICATIONS

Zhaoliang et al., "Separate/simultaneous catalytic reduction of sulfur dioxide and/or nitric oxide by carbon monoxide over titanium-tin solid solution catalysts", Chemical Engineering Journal 95 (2003) 15-24.*

*Primary Examiner* — Stanley Silverman
*Assistant Examiner* — Anthony J Zimmer
(74) *Attorney, Agent, or Firm* — Thaddius J. Carvis

(57) ABSTRACT

Embodiments of the present disclosure include a catalyst for the conversion of CO and/or hydrocarbons in an exhaust stream including a Sn compound selected from the group consisting of a binary composition comprising Sn and Ti, a ternary composition comprising Sn, Ti and Zr, and mixtures of any thereof. In those embodiments, the binary composition may include $Sn_{(x)}Ti_{(y)}O_2$, wherein x+y=1, 0.85>y>0. In other embodiments of the present disclosure, the Sn compound includes a ternary composition including $Sn_{(a)}Ti_{(b)}Zr_{(c)}O_2$, wherein a is 0.25, b is 0.25 and c is 0.5. Certain embodiments of this disclosure include a method for the conversion of CO in an exhaust stream, including contacting an exhaust stream containing CO with the catalyst described above containing a Sn compound. In other embodiments, the exhaust stream includes hydrocarbons.

19 Claims, 17 Drawing Sheets

U.S. PATENT DOCUMENTS

| | | | |
|---|---|---|---|
| 5,430,230 A * | 7/1995 | Mitsui et al. | 588/320 |
| 6,350,421 B1 * | 2/2002 | Strehlau et al. | 423/213.2 |
| 7,179,316 B2 * | 2/2007 | Merkel et al. | 55/523 |
| 2003/0007905 A1 * | 1/2003 | Tanaka et al. | 422/180 |

* cited by examiner

CATALYSTS FOR LEAN BURN ENGINES

CROSS REFERENCE

This application claims priority from provisional application 61/180,122, filed May 20, 2009, the entire contents of which are incorporated herein by reference, including any references cited therein.

FIELD OF THE INVENTION

The present invention is directed to catalysts and compositions for treating emissions from lean burn engines such as diesel engines, gas turbines, boilers, furnaces, and process heaters.

BACKGROUND OF THE INVENTION

Exhaust gas from internal combustion engines, power plants, industrial furnaces, heaters, diesel engines, and other devices contain harmful pollutants such as nitrogen oxides, carbon monoxide, unburned hydrocarbons and particulate matter. Exhaust gases from these sources also contain excess levels of oxygen, water vapor, and sulfur dioxide. Often times, exhaust with excess oxygen levels is known as lean exhaust and engines that generate such exhaust are referred to as lean burn engines. Oxygen levels in exhaust gases from lean burn engines can vary anywhere from 1% to 20%.

Emissions of nitrogen oxides, carbon monoxide, and hydrocarbons are subject to limits due to environmental regulations. Emission control systems containing catalysts are used to decrease the pollution caused by exhaust. The temperature of the exhaust gases from lean burn engines where emission control catalysts are located can be anywhere from 100° C. to 700° C.

A common catalyst used in such applications for the purpose of removing carbon monoxide and unburnt hydrocarbons is known as an oxidation catalyst. Prior art oxidation catalysts are made using platinum in the range of greater than 10 grams per cubic feet of the catalyst.

With the ever stricter standards for acceptable emissions, the demand on platinum group metals continues to increase due to their efficiency in removing pollutants from exhaust. Platinum group metals include platinum, palladium, ruthenium, iridium, osmium and rhodium. However, this demand along with other demands for platinum group metals strain the supply of platinum group metals, which in turn drives up the cost of platinum metal and therefore catalysts and associated emission control systems as well. In oxidation catalysts used for treating lean burn exhausts, the amount of precious metal (platinum) used constitutes about 60 to 90% of the total cost of the oxidation catalyst itself.

While palladium, which has good oxidation properties and is not as expensive as platinum, can be used instead, large amounts of palladium are typically required in an oxidation catalyst, which in turn increases the cost of the oxidation catalyst and defeats the purpose of using a lower cost platinum group metal. Prior art oxidation catalysts are made using palladium in the range of several hundred grams of palladium per cubic feet of the oxidation catalyst.

In light of the above, there is a strong need for efficient catalyst formulations that contain very low amounts of precious metal content, especially palladium or platinum, or do not require the use of platinum group metals at all.

SUMMARY OF THE INVENTION

Embodiments of the present disclosure include a catalyst for the conversion of CO and/or hydrocarbons in an exhaust stream including a Sn compound selected from the group consisting of a binary composition comprising Sn and Ti, a ternary composition comprising Sn, Ti and Zr, and mixtures of any thereof. In those embodiments, the binary composition may include $Sn_{(x)}Ti_{(y)}O_2$, wherein $x+y=1$, $0.85>y>0$. In other embodiments, $0.5>y>0.05$. In still further embodiments, the binary composition comprises a rutile crystal phase.

In other embodiments of the present disclosure, the Sn compound includes a ternary composition including $Sn_{(a)}Ti_{(b)}Zr_{(c)}O_2$, wherein a is 0.25, b is 0.25 and c is 0.5. In certain embodiments, the ternary composition includes a srilankite crystal phase.

Certain embodiments of this disclosure include a method for the conversion of CO in an exhaust stream, including contacting an exhaust stream containing CO with the catalyst described above containing a Sn compound. In other embodiments, the exhaust stream includes hydrocarbons.

DETAILED DESCRIPTION OF THE INVENTION

Figure 1:
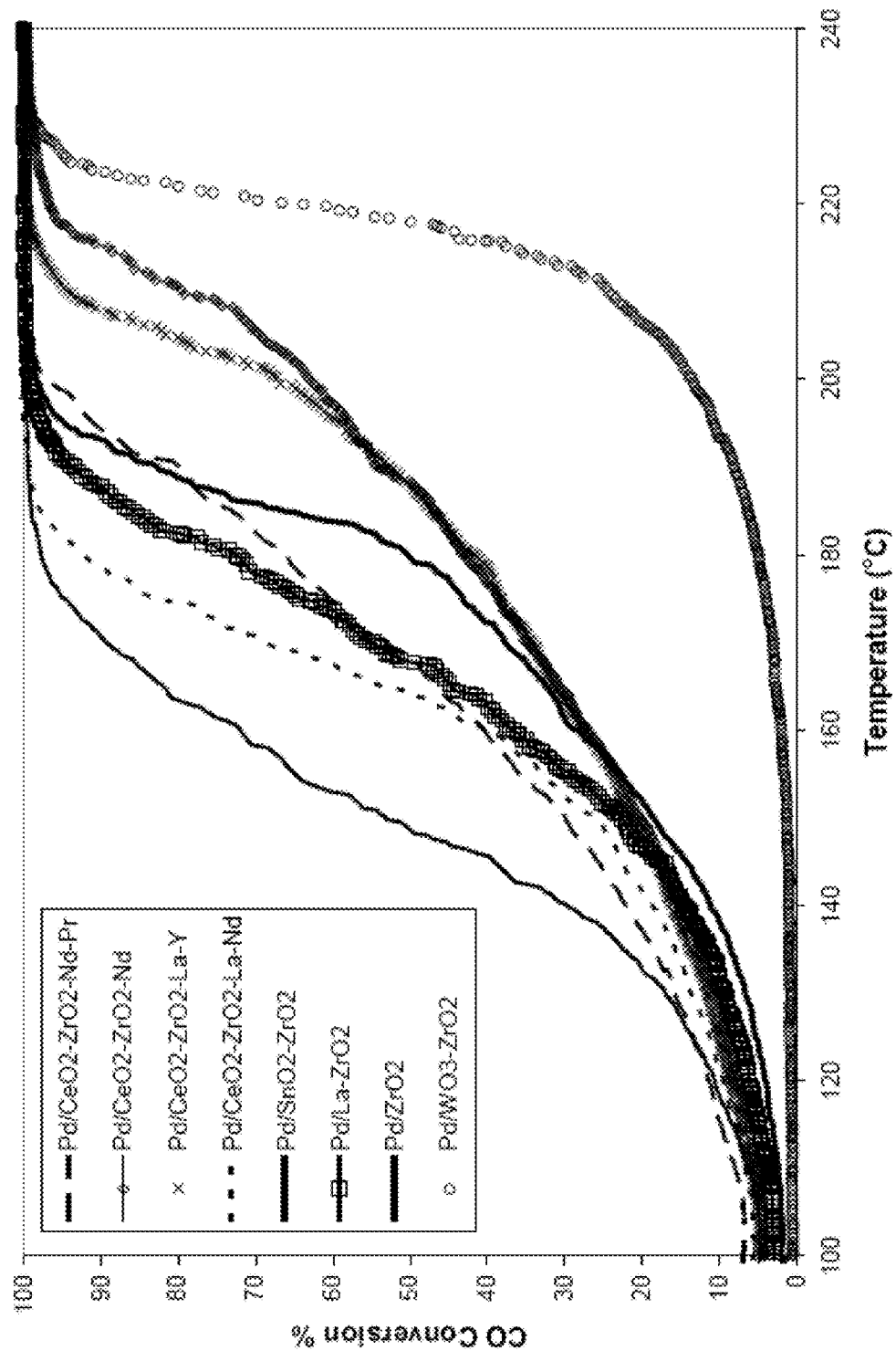
FIG. 1 is a graph depicting CO conversion versus temperature in degrees centigrade at SV=75K hr$^{-1}$ for various low palladium containing catalysts using a simulated diesel exhaust.

In one embodiment, the novel catalyst formulation of the present invention comprises a) no precious or platinum group metals, b) base metals and c) oxides. In another embodiment, the novel catalyst formulation of the present invention comprises a) very low precious metals (where platinum is less than 10 grams per cubic feet of catalyst or palladium is less than 100 grams per cubic feet of catalyst) and b) oxides. Such catalyst compositions can be used to remove harmful pollutants such as carbon monoxide and un burnt hydrocarbons from lean burn exhaust engines. Carbon monoxide and un burnt hydrocarbons can react with excess oxygen in such lean exhausts in the presence of an oxidation catalyst as disclosed in this invention and get converted to harmless $CO_2$ and water vapor.

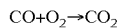

$$CO+O_2 \rightarrow CO_2$$

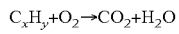

$$C_xH_y+O_2 \rightarrow CO_2+H_2O$$

Base metals in such oxidation catalysts can be copper, iron, nickel, tungsten, vanadium and chromium or mixtures thereof. The catalysts can contain precious metals such as platinum and palladium in very low quantities, lower than conventional oxidation catalysts used in lean burn engines for CO oxidation purposes. More specifically, the ranges of precious metals, such as platinum and palladium, used in the novel catalyst formulations is limited to less than 10 grams per cubic foot (for platinum) and less than 100 grams per cubic foot (for palladium) of the catalyst.

The inorganic oxides can be (a) a high surface area inorganic oxide material (b) mixed metal oxides, (c) framework structured materials such as zeolites, (d) any structured or amorphous inorganic oxide material, (e) cerium based oxygen storage material, or (f) any combinations thereof. Such formulations may find extensive applications behind lean burn engines such as diesel engines, gas turbines, boilers, process heaters and furnaces. Such catalysts can be used either as stand alone catalyst systems or in combination with other emission control catalysts such as a filter or a NOx catalyst behind such lean burn engines.

The catalyst is formed by coating the formulation on to a substrate. The formulation comprises either base metals or very low precious metals. The formulation also comprises an oxide material. The catalyst formulations can be coated on to the desired substrate in one step or in several steps process. In a one step process, the catalyst formulation comprising the very low precious metals and/or the base metals is combined with the oxide materials and are coated. Alternatively, the base metals and/or the very low precious metals can be precipitated on to the oxide material and the combination can then be coated on to a substrate.

If the oxide material is coated on to the substrate first, it is referred to as a washcoat. On such a washcoated substrate, base metals and/or very low precious metals are then impregnated to create at the novel oxidation catalyst formulation. The catalyst can also be formed by extruding the formulation comprising of the oxide material, the base metals and/or the very low precious metals along with other support media into a shape. Alternatively, the oxide material can be extruded into a shape upon which the base metals and/or the very low precious metals can be incorporated via impregnation into the extruded shape which contains the oxide material.

Substrates

The substrate of the present invention may be, without limitation, a refractive material, a ceramic substrate, a honeycomb structure, a corrugated structure, a metallic substrate, a ceramic foam, a metallic foam, a reticulated foam, a fiber material, a woven inorganic material, or suitable combinations, where the substrate has a plurality of channels and at least the required porosity of less than or equal to 50%. Porosity is substrate dependent as is known in the art. Additionally, the number of channels may vary depending upon the substrate used as is known in the art. Based on the teachings of this specification, the type and shape of a suitable substrate would known to one of ordinary skill in the art. Preferably, all of the substrates, either metallic or ceramic, offer a three-dimensional support structure.

In one embodiment, the substrate may be in the form of beads or pellets. The beads or pellets may be formed from, without limitation, alumina, silica alumina, silica, titania, mixtures thereof, or any suitable material. In another embodiment, the substrate may be, without limitation, a honeycomb substrate. The honeycomb substrate may be a ceramic honeycomb substrate or a metal honeycomb substrate. The ceramic honeycomb substrate may be formed from, for example without limitation, sillimanite, zirconia, petalite, spodumene (lithium aluminum silicate), magnesium silicates, mullite, alumina, cordierite (e.g. $Mg_2Al_4Si_5O_{18}$), other alumino-silicate materials, silicon carbide, aluminum nitride, or combinations thereof. Based on the teachings of this specification, other ceramic substrates would be known to one of ordinary skill in the art.

In one embodiment, the substrate can be a fibrous reinforced material. Such fibrous reinforced materials can be composite materials made from two or more materials.

If the substrate is a metal honeycomb substrate, the metal may be, without limitation, a heat-resistant base metal alloy, particularly an alloy in which iron is a substantial or major component. The surface of the metal substrate may be oxidized at elevated temperatures above about 1000° C. to improve the corrosion resistance of the alloy by forming an oxide layer on the surface of the alloy. This oxide layer on the surface of the alloy may also enhance the adherence of a washcoat to the surface of the monolith substrate.

In one embodiment, the substrate may be a monolithic carrier having a plurality of fine, parallel flow passages extending through the monolith. The passages can be of any suitable cross-sectional shape and/or size. The passages may be, for example without limitation, trapezoidal, rectangular, square, sinusoidal, hexagonal, oval, or circular, although other shapes are also suitable. The monolith may contain from about 9 to about 1200 or more gas inlet openings or passages per square inch of cross section, although fewer passages may be used.

The substrate can also be any suitable filter for particulates. Some suitable forms of substrates may include, without limitation, woven filters, particularly woven ceramic fiber filters, wire meshes, disk filters, ceramic honeycomb monoliths, ceramic or metallic foams, wall flow filters, and other suitable filters. Wall flow filters are similar to honeycomb substrates for automobile exhaust gas catalysts. They may differ from the honeycomb substrate that may be used to form normal automobile exhaust gas catalysts in that the channels of the wall flow filter may be alternately plugged at an inlet and an outlet so that the exhaust gas is forced to flow through the porous walls of the wall flow filter while traveling from the inlet to the outlet of the wall flow filter.

First Component

The first component in the catalyst is either a precious metal or a base metal. When precious metal is used, the concentration of the precious metal in the catalyst is very low, much lower than the prior art oxidation catalysts. Palladium and platinum are preferred precious metals. The first component can be very low levels of palladium only or a combination of low levels of palladium and platinum.

When the first component is a combination of platinum and palladium; palladium and platinum can be introduced to the catalyst by using their precursors such as palladium and platinum salts. Palladium nitrate and platinum nitrate are such preferred precursor salts. Using a Platinum complex with ethylenediamine is another preferred example of a platinum precursor. When the first metal is a combination of platinum and palladium, both metals can be introduced simultaneously to form the final catalyst. In an embodiment, platinum can be introduced first followed by palladium. In another embodiment, palladium can be introduced first followed by platinum deposition. In an embodiment, platinum in the catalyst can be introduced using a mixture of platinum ethylene diamine and platinum nitrate precurors. In an embodiment, platinum and palladium nitrates can be mixed and introduced into the catalyst, followed by a post-impregnation step where in further platinum is introduced using platinum ethylene diamine complex.

Alternatively, the first component can be completely free from precious metals and, instead, use base metals, such as copper, iron, nickel, tungsten, vanadium, chromium or manganese. Accordingly, acceptable first components include:
1. Platinum alone in the range of less than 10 grams per cubic feet of catalyst;
2. Palladium alone in the range of less than 100 grams per cubic feet of catalyst;
3. Palladium in combination with platinum where the platinum is less than 10 grams per cubic feet of catalyst and the palladium is less than 100 grams per cubic feet of catalyst. A preferred combined catalyst composition uses 3 grams per cubic foot platinum and 3 grams per cubic foot palladium.
4. One or more base metals in the range of less than 2000 grams per cubic feet of catalyst or in the range of 0.001% to 30% relative to weight of the final catalyst.

In an embodiment, the first component can be mixed with the second component (see below) and can be coated onto a substrate. Alternatively, in another embodiment, the first component can be coated after the second component is coated on a suitable substrate. When a base metal is used, the first component is coated such that the final amount of the first component is in the range of 1% to 30% relative to weight of the final catalyst.

The first component can be coated by first mixing metal salts of the desired first component such as metal nitrates, acetates and chlorides or their mixtures with water. In another embodiment, the first component can be coated by dipping the substrate, which has already been coated with the second component (see below), into a solution formed by mixing the first component metal precursor or mixtures of first component metal precursors and known amounts of water. Other methods of depositing include, but are not limited to, spraying or vapor depositing the first component onto the coated substrate as known to persons skilled in the art.

Second Component

The second component can be (a) a high surface area (>1 m2/g) inorganic oxide material (b) mixed metal oxides (c) framework structured materials such as zeolites (d) any structured or amorphous inorganic oxide material, (e) any cerium based oxygen storage material, or any of their combinations. The amount of second component in the catalyst can be anywhere from 70% to 99.9%.

Washcoat

According to an embodiment, at least a portion of the catalyst of the present invention may be placed on the substrate in the form of a washcoat. The oxide solids in the washcoat may be one or more oxide materials, e.g. the second component. The washcoat may or may not contain base metal. Carrier material oxides, e.g. the washcoat containing the oxide material, are normally stable at high temperatures (>1000° C.) and under a range of reducing and oxidizing conditions. The carrier oxide material or the second component in the catalyst can be (a) a high surface area inorganic oxide material (b) mixed metal oxides (c) framework structured materials such as zeolites (d) any structured or amorphous inorganic oxides material, such as cladded oxides for example, (e) any cerium based oxygen storage material, or any of their combinations.

Various amounts of any of the washcoats of the present invention may be coupled with a substrate, preferably an amount that covers most of, or all of, the surface area of a substrate. In an embodiment, about 10 g/L to about 500 g/L of a washcoat may be coupled with a substrate.

In an embodiment, a washcoat may be formed on the substrate by suspending the oxide solids in water to form an aqueous slurry and depositing the aqueous slurry on the substrate as a washcoat.

Other components may optionally be added to the aqueous slurry. Other components such as acid or base solutions or various salts or organic compounds may be added to the aqueous slurry to adjust the rheology of the slurry and/or enhance binding of the washcoat to the substrate. Some examples of compounds that can be used to adjust the rheology include, but are not limited to, ammonium hydroxide, aluminum hydroxide, acetic acid, citric acid, tetraethylammonium hydroxide, other tetralkylammonium salts, ammonium acetate, ammonium citrate, glycerol, commercial polymers such as polyethylene glycol, polyvinyl alcohol and other suitable polymers.

The slurry may be placed on the substrate in any suitable manner. For example, without limitation, the substrate may be dipped into the slurry, or the slurry may be sprayed on the substrate. Other methods of depositing the slurry onto the substrate known to those skilled in the art may be used in alternative embodiments. If the substrate is a monolithic carrier with parallel flow passages, the washcoat may be formed on the walls of the passages. Gas flowing through the flow passages can contact the washcoat on the walls of the passages as well as materials that are supported on the washcoat.

Some oxide materials may improve the rheology of the washcoat slurry and/or the adhesion of the washcoat slurry on to the substrate. Such improvements may be seen in process control and/or manufacture of the catalyst system.

High Surface Area Inorganic Oxide Materials and Oxygen Storage Materials

At least a portion of the second component can be selected from the group consisting of alumina, silica, zirconia, titania, composite oxides and/or mixtures thereof, which are expected to have surface areas anywhere from 10 m$^2$/g to 1000 m$^2$/g. Such inorganic oxide materials may be doped with transition metals including lanthanides and actinides to enhance their thermal stability.

According to one embodiment, the catalyst may contain lanthanum doped zirconia as the high surface area inorganic carrier material. In such a material the lanthanum content can be anywhere from 1% to 10% weight percent of the oxide.

According to another embodiment, the catalyst may contain tin-titania as the high surface area inorganic carrier material. In such a material the amount of tin can vary anywhere from 1% to 50% weight percent of the oxide.

At least a portion of the second component can be selected from the group consisting of cerium based oxygen storage materials. The oxygen storage material can be $CeO_2$, $Ce_{1-\alpha}Zr_\alpha O_2$, a ceria-zirconia doped with a lanthanide or a mixture of lanthanides, or any combination thereof. In one embodiment, the cerium based oxygen storage material comprises cerium, zirconium, prasadeneum and neodeneyum. In another embodiment, the cerium based oxygen storage material comprises cerium, zirconium, lanthanum and yttrium.

Mixed Metal Oxides and Structured Materials

According to one embodiment, the catalyst may contain mixed metal oxides. Such oxides comprise at least one transition metal and at least one other metal. The other metals of the mixed metal oxide may include, but are not limited to alkali and alkaline earth metal, lanthanides, or actinides. For example, the mixed metal oxide may be a binary oxide, a ternary oxide, a spinel, a perovskite, a delafossite, a lyonsite, a garnet, or a pyrochlore.

Mixed Metal Oxides Including Sn, Ti and Optionally, Zr

In one embodiment, the catalyst may include a binary mixed oxide material wherein the components of the mixed oxide are tin and titania, or Sn—Ti. In another embodiment, the catalyst can comprise ternary mixed oxide material where in the components of the mixed oxide are titania, tin and zirconia, or Ti—Sn—Zr. In a further embodiment, the catalyst may include a mixture of these binary and ternary oxides.

Embodiments of the present disclosure include a catalyst for the conversion of CO and/or hydrocarbons in an exhaust stream including a Sn compound selected from the group consisting of a binary composition comprising Sn and Ti, a ternary composition comprising Sn, Ti and Zr, and mixtures of any thereof. In those embodiments, the binary composition may include $Sn_{(x)}Ti_{(y)}O_2$, wherein x+y=1, 0.85>y>0. In other embodiments, 0.5>y>0.05. In still further embodiments, the binary composition comprises a rutile crystal phase.

In other embodiments of the present disclosure, the Sn compound includes a ternary composition including $Sn_{(a)}Ti_{(b)}Zr_{(c)}O_2$, wherein a is 0.25, b is 0.25 and c is 0.5. In certain embodiments, the ternary composition includes a srilankite crystal phase.

Figure 17:
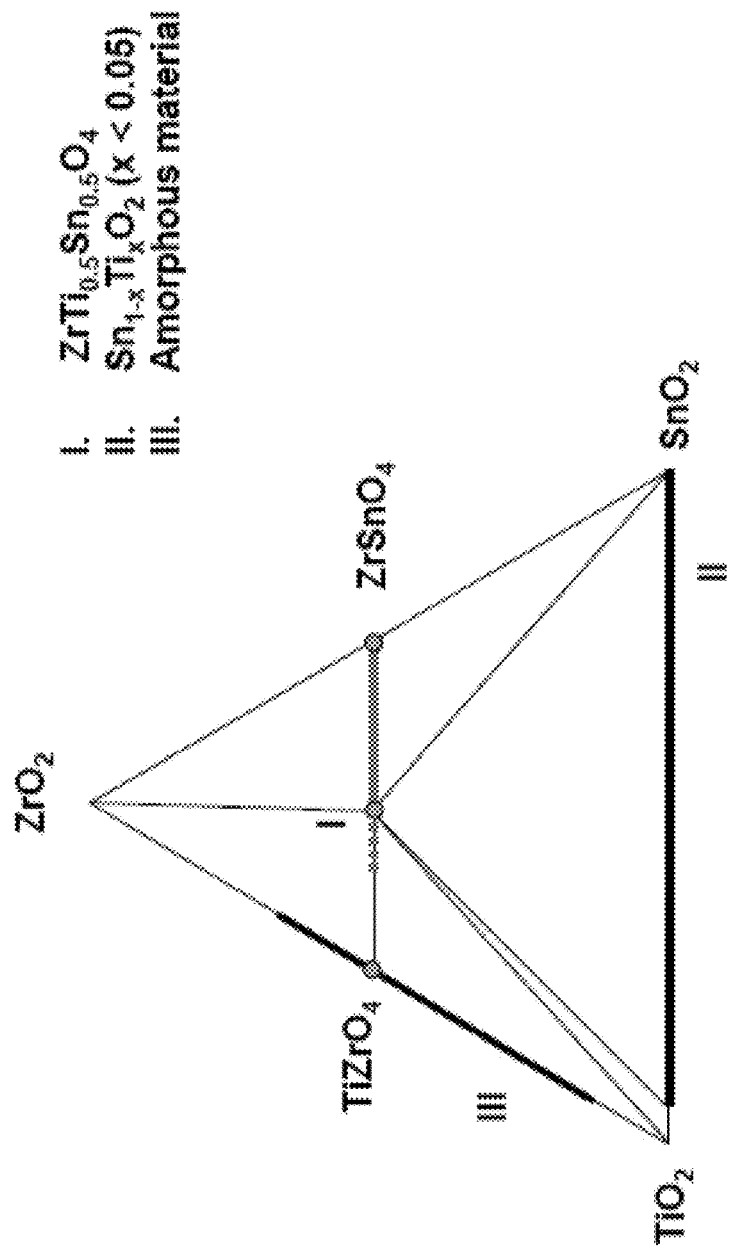
FIG. 17 is a phase diagram describing certain compositions from Example 8.

The diagram shown in FIG. 17 is one example of a phase diagram. A phase diagram graphically portrays conditions at which thermodynamically distinct phases can occur at equilibrium. Different regions of the diagram correspond to different compositions. For example, each corner of FIG. 17 indicates a pure Zr, Ti or Sn oxide. The lines making up each edge of the triangle define a binary compound made up of the two compounds at each distal point of the line. Each point within the triangle and not at a distal end of a line or on a line represents a ternary mixture of the three components.

In certain embodiments of the present invention, the Sn compound comprises a composition defined by a region of a phase diagram between $Zr_{0.5}Sn_{0.25}Ti_{0.25}O_2$ and $Sn_{1-x}Ti_xO_2$, where x greater than or equal to 0 and less than 0.85. In this instance, $Sn_{1-x}Ti_xO_2$ defines a line along the bottom of a phase diagram for Ti, Sn and Zr compounds between the points defining pure $TiO_2$ and $SnO_2$. The composition of $Zr_{0.5}Sn_{0.25}Ti_{0.25}O_2$ represents a single point in the phase diagram within the triangle. Together, the region between the line and the point make up a triangle that is a subset of the overall phase diagram. In this embodiment, the Sn compound may include any composition defined by the triangle formed between the point ($Zr_{0.5}Sn_{0.25}Ti_{0.25}O_2$) and the line ($Sn_{1-x}Ti_xO_2$). In further embodiments, x greater than or equal to 0.05 and less than 0.85.

In addition to the region between a point and a line, the region of interest of the phase diagram may be described by a series of iterative lines between the point and a line. In certain embodiments, the Sn compound comprises a composition defined by a region of a phase diagram between $Zr_{0.5}Sn_{0.25}Ti_{0.25}O_2$ and rutile SS $Sn_{1-x}Ti_xO_2$ where 0.05<x<0.85, comprising: $Zr_aSn_bTi_c$, where a, b and c comprise:

a=0.5 b=0.25, c=0.25;
a=0.4 0.23<b<0.39, 0.21<c<0.37; where b+c=0.6;
a=0.3 0.21<b<0.53, 0.17<c<0.49; where b+c=0.7;
a=0.2 0.19<b<0.67, 0.13<c<0.61; where b+c=0.8;
a=0.1 0.17<b<0.81, 0.09<c<0.73; where b+c=0.9;
a=0 0.15<b<0.95, 0.05<c<0.85; where b+c=1.0; and all intermediate regions of the phase diagram between a=0 and a=0.5. This describes the area between a point and a line in a phase diagram.

Embodiments of the catalyst containing these Sn compounds may further include a catalyst component selected from the group consisting of Pt, Pd, one or more base metals, and combinations of any thereof, wherein the base metal is selected from the group consisting of Cu, Fe, Ni, W, V, Cr, Mn, Co, and mixtures of any thereof. In some embodiments, the catalyst component is Pd. In certain embodiments comprising a catalyst component, the Sn compound may include the binary compound comprising $Sn_{1-x}Ti_xO_2$, wherein 0.5>x>0.05. In certain embodiments, the active components of the catalyst may be limited to the Sn compound and the catalyst component.

Certain other embodiments of the catalyst including these Sn compounds may further include a zeolite. In these embodiments, the zeolite may be selected from the group consisting of ZSM-5, ZSM-11, ZSM-12, ZSM-18, ZSM-23, MCM-zeolites, mordenite, faujasite, ferrierite, zeolite beta, and mixtures thereof.

Some embodiments of the present disclosure include an apparatus for the conversion of CO in an exhaust stream, comprising the catalyst described above containing the Sn compound and a substrate, wherein the catalyst is placed on the substrate. In some embodiments, the substrate includes a ceramic support. In still other embodiments, the ceramic support includes a material selected from the group consisting of cordierite and silicon carbide. In further embodiments, the substrate includes a particulate filter. In certain of those embodiments, the particulate filter includes a wall flow filter. And in still further embodiments, the particulate filter includes a diesel particulate filter.

Certain embodiments of this disclosure include a method for the conversion of CO in an exhaust stream, including contacting an exhaust stream containing CO with the catalyst described above containing a Sn compound. In other embodiments, the exhaust stream includes hydrocarbons.

Other Mixed Metal Oxides

According to another embodiment, the catalyst comprises a perovskite having the formula $ABO_3$ or a related structure with the general formula $A_{a-x}B_xMO_b$, wherein (1) "a" is 1 or 2, (2) "b" is 3 when "a" is 1 or "b" is 4 when "a" is 2, and (3) "z" is a number defined by 0.1<x<0.7. The element "A" comprises lanthanum, lanthanides, actinides, cerium, magnesium, calcium, barium, strontium, or mixtures thereof. The element "B" comprises a single transition metal, or a mixture of transition metals, including but not limited to, iron, manganese, copper, nickel, cobalt, and cerium, or mixture thereof. According to another embodiment, the catalyst may have the formula $AMn_{1-x}Cu_xO_3$, wherein "A" is lanthanum, cerium, barium, strontium, a lanthanide, or an actinide and "x" is 0 to 1.

According to another embodiment, the catalyst may have the formula $ACe_{1-x}Cu_xO_3$, wherein "A" is barium, strontium, or calcium, and "x" is 0 to 1. According to another embodiment, about 10 g/L to about 180 g/L of the formula $ABO_3$ may be coupled with the substrate.

According to one embodiment, the catalyst comprises a perovskite ($ABO_3$) or related structure (with general formula $A_{a-x}B_xO_b$) and one or more of a carrier material oxide. The perovskite or related structure is present in about 5% to about 50% by weight of the final catalyst.

According to another embodiment, the catalyst comprises a spinel having the formula $AB_2O_4$. "A" and "B" of the formula is aluminum, magnesium, manganese, gallium, nickel, copper, cobalt, iron, chromium, titanium, tin, or mixtures thereof. According to another embodiment, the catalyst comprises a spinel with another suitable oxide material. The spinel is present in about 5% to about 50% by weight of the final catalyst.

According to another embodiment, the catalyst comprises of cladded inorganic oxide materials as the washcoat. Cladded silica alumina inorganic oxide material is such an example.

Framework Structures (Zeolites)

At least a portion of the second component can be selected from group framework materials or zeolites, and mixtures thereof. Zeolites are crystalline silica aluminas. Suitable zeolites include, but are not limited to zeolite-A, chabazite, EMT zeolite, Y-zeolite, X-zeolite, L-zeolite, mordenite, ferrierite, ZSM-5, ZSM-11, and beta-zeolite, and mixtures thereof. Other types of framework materials include, but are not limited to MCM11, MCM41, SBA15. Preferably, at least a portion of the zeolite or mixture of zeolites is in the H or ammonium form. In one embodiment, at least a portion of at least one zeolite is at least partially exchanged with at least one element from the periodic table in Group IA, IB, IIA, LIB, IIIB, the rare earths, and mixtures thereof. In an alternative embodiment, the zeolite can be exchanged with the base metal. In another embodiment, the zeolite is selected from the group consisting of ZSM-5, ZSM-11, beta-zeolite, mordenite, ferrierite, Y-zeolite, X-zeolite, and mixtures thereof.

The catalyst with the first and the second components can be made either by coating the formulations on to a pre-existing substrate or can be made by extruding the formulation into a defined shape. When coated, the catalyst can be made by co-milling the first component with the second component, or by adding solution of the first component to the milled second component, or by post-impregnating the first component on to the coated washcoat. The catalyst can also be made by precipitating the first component on the oxide material and then coating the obtained material.

Catalyst Preparation

Catalyst Preparation by Impregnation

A washcoat having the properties discussed herein may be prepared by methods well known in the art. The washcoat may comprise any of the catalysts and/or additional components described herein. In one embodiment, a slurry is made by milling the washcoat to a desired particle size. The amount of solids in the slurry can be anywhere from 20% to 80% of the slurry by weight. A slurry containing the washcoat is then placed on a 100-600 cells per square inch monolith substrate such that the wall passages of the monolith are coated with the washcoat. The washcoat loading on the monolith is between approximately 100 g/L and 180 g/L, preferably the loading is approximately 150 g/L. The coated monolith is examined to determine whether any channels are plugged by the washcoat slurry. If there are plugged or clogged channels, they are cleared. The washcoated substrate is dried for approximately 0.5 to 15 hours.

The washcoat, now deposited on a substrate, is treated to ensure adhesion between the substrate and washcoat. The treating is done at a temperature between 300° C. and 700° C. The treating may last from about 1 to about 6 hours, preferably about 4 hours. After the washcoat and the substrate are treated, they are cooled to room temperature. After the washcoat and the substrate are cooled, the washcoat is impregnated with at least one first component. The impregnation of the first component includes, without limitation, first component metal salts or their mixtures dissolved in water and impregnated on the washcoat. Following the impregnation step, the washcoat with the impregnation components are treated. The treating may be performed at about 300° C. to about 700° C., preferably about 550° C. The treatment may last from about 1 to about 6 hours, preferably about 4 hours.

According to one embodiment, the substrate, the washcoat, and the impregnation components may be treated to form the catalyst composition before or after the washcoat and/or the impregnation components are added to the substrate. In an embodiment, the washcoat and the impregnation component may be treated before coating.

Catalyst Preparation by Metallization

A washcoat can be prepared by following the procedure described in the above section. A solution is made by using the first component metal precursors and water. This solution is mixed with the washcoat and is known as a metalized slurry. Known amounts of such metalized slurry can be deposited on a substrate. After deposition of such a metalized slurry, the coated substrate is treated at about 300° C. to about 700° C. The treating may last from about 1 to about 6 hours, preferably about 4 hours. When two or more metals are used as the first component in the final catalyst; the metalized slurry can have both metals or the metalized slurry can have one preferred metal and the second or subsequent metal can be incorporated after heat treating the coated substrate using an impregnation step described above. In an embodiment, the first component comprises of precious metals from which a metalized slurry can be deposited on to a substrate and heat treated to obtain the final catalyst. In an another embodiment, the catalyst is made by metallization of palladium containing slurry, followed by heat treatment to get a palladium coated catalyst. Upon such a catalyst, platinum can be post impregnated to get a combined platinum and palladium coated catalyst.

Catalyst Preparation by Precipitation

The method of precipitation includes precipitating the first component salt or salts on a washcoat. The first component metal salt or salts may be precipitated with, but is not limited to $NH_4OH$, $(NH_4)_2CO_3$, tetraethylammonium hydroxide, other tetralkylammonium salts, ammonium acetate, or ammonium citrate. The washcoat may be any washcoat described herein. Next, the washcoat precipitated with first component metal salt or salts is treated. The treating may be from about 0.2 hours to about 24 hours. Next, the washcoat with precipitated first component metal salt or salts are deposited on a substrate followed by treating for about 2 hours to about 6 hours, preferably about 4 hours at a temperature of about 300° C. to about 700° C., Catalyst Preparation by Co-milling The first component, and the second component can be milled together to make a slurry with a defined particle size. The first component can be pre-synthesized or a first component metal precursor or first component metal precursors can be used to make such a slurry. When a pre-synthesized first component is used, the pre-synthesis can occur by any chemical technique such as, but not limited to solid-state synthesis, precipitation, or any other technique known in the art. Such milled catalyst slurry comprising the first component and the second component are deposited on a substrate in the form of a washcoat and then treated. The treatment may be from about 2 hours to about 6 hours, preferably about 4 hours and at a temperature of about 300° C. to about 700° C.

Catalyst Testing and Aging

The catalyst compositions made from the procedures described above are tested for their CO oxidation activity using a simulated feed stream comprising of 50 to 2000 ppm carbon monoxide, 1 to 20% oxygen, 1 to 10% $CO_2$, 2 to 20% water vapor, 5 to 500 ppm NOx, various hydrocarbons, and with balance gas as nitrogen. In some cases, the catalyst samples were aged using accelerated aging conditions with 20 ppm $SO_2$, 10% H2O at 400° C. In some cases, the catalysts were hydrothermally aged at 750° C. for 20 hours using a gas consisting of 10% $H_2O$ with balance air.

One of the factors on which the amount of catalyst volume required for any application is governed by the catalyst space velocity at which the catalyst can operate to achieve the desired or the target conversion. Catalyst space velocity is defined as the exhaust flow in standard cubic feet per hour or SCFH divided by the catalyst volume in cubic feet. Thus the unit of space velocity is inverse hours.

The space velocity of the exhaust gas passing through the oxidation catalyst according to embodiments of the present invention is in the range of approximately 1,000 hr-1 to approximately 500,000 hr-1, more preferably in the range of approximately 1,000 hr-1 to approximately 200,000 hr-1, and most preferably in the range of 1,000 hr-1 to approximately 100,000 hr-1.

The CO conversion activity was either measured as a function of temperature at a fixed space velocity and/or measured at 400° C. at various space velocities as can be seen from examples below.

EXAMPLES

Example 1

Low Levels of Palladium Only Catalysts

Palladium only loaded catalysts on various support oxide materials were prepared by following the impregnation procedure described above. Palladium loading on all such catalysts was 1.4 grams per liter or 40 grams per cubic foot of catalyst. The catalyst samples thus prepared were hydrothermally aged at 750° C. for 20 hours using a gaseous mixture containing 10% H2O balance air. The hydrothermally aged samples were tested for CO oxidation activity using the test conditions described below and, in particular, exhaust gas concentrations typically seen in diesel applications:

TABLE 1

Typical test conditions using simulated diesel exhaust

| Species | Concentration |
| --- | --- |
| CO | 1500 ppm |
| NO | 100 ppm |
| $H_2O$ | 4% |
| $O_2$ | 14% |
| $CO_2$ | 4% |
| Aromatics | 50 ppm |
| Hydrocarbons | 100 ppm |
| $N_2$ | Balance |

The results using such low palladium oxidation catalysts are shown in FIG. 1, which depicts a plot of CO conversion versus temperature in degrees centigrade for catalysts containing low levels of palladium, using a simulated diesel exhaust. The figure shows a plot of CO conversion activity as a function of temperature at a space velocity of 75,000 hr-1. Efficiency of the catalyst formulation is measured by achieving greater conversion effectiveness at a temperature as low as possible. The results indicate that based on the choice of the second component, the conversion efficiency can vary significantly, even with identical amounts of palladium, thereby demonstrating the significance of low palladium loading and the interaction between such low palladium loaded catalysts and the choice of the second component. The results indicate that it is advantageous to use for example Pd/$ZrO_2$ as it shows essentially 100% CO conversion beyond 180-200° C. even after subjecting the sample to severe hydrothermal aging (750° C./20 hours). When the same $ZrO_2$ is mixed with a trace amount of tungsten oxide ($WO_3$) one can see that conversion temperature is pushed significantly towards higher temperatures.

Example 2

Low Levels of Palladium and Platinum Containing Catalysts

Figure 2:
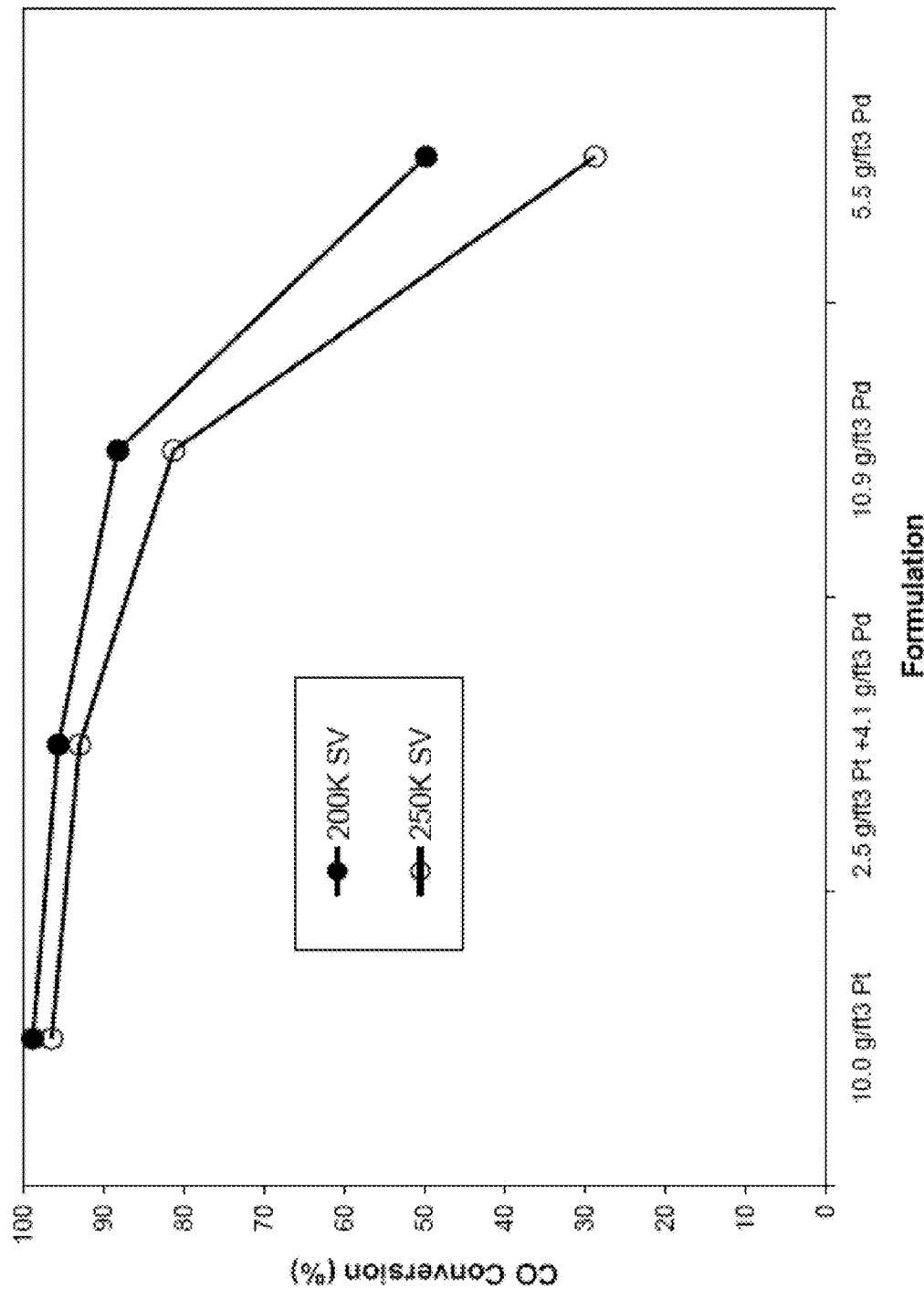
FIG. 2 is a graph depicting CO conversion at 400° C. versus low precious metal containing formulations.

FIG. 2 shows a plot of CO conversion versus formulations containing a) a first component having either platinum or palladium or their mixtures and b) a second component that is a high surface area lanthanum stabilized alumina. The catalysts were aged at 400° C. with a feed stream containing 20 ppm $SO_2$, 10% $H_2O$ and balance $N_2$ for 20 hours and tested. Testing was carried out at two different space velocities at 200,000 hr-1 and 250,000 hr-1 using a gas composition as below:

TABLE 2

Typical test conditions using simulated gas turbine exhaust

| Species | Concentration |
| --- | --- |
| CO | 50 ppm |
| NO | 25 ppm |
| H2O | 10% |
| O2 | 12% |
| CO2 | 6% |
| N2 | Balance |

The results shown in FIG. 2 indicate that it is beneficial to have formulations mixed with platinum and palladium. Such a benefit is realized even when the catalyst has low levels of precious metals. Thus such catalysts allow even further reduction of overall cost of the catalyst as platinum is 3 to 4 times more expensive than palladium, typically without significant loss of CO oxidation performance. Thus a sample containing 2.5 g/ft³ Pt combined with 4.1 g/ft³ palladium offers about the same level of conversion (~95%) as that of a 10 g/ft³ platinum catalyst.

Figure 3:
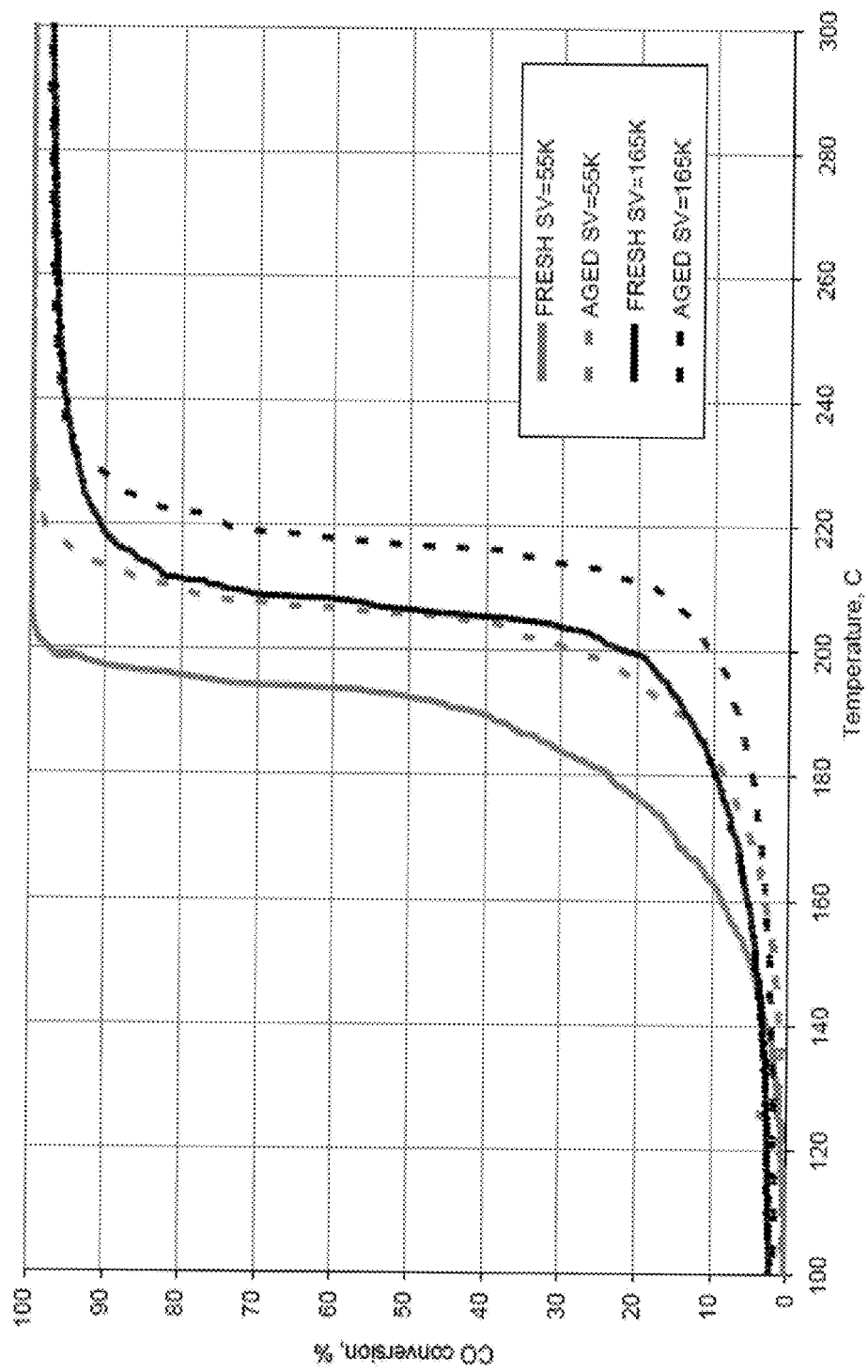
FIG. 3 is a graph depicting CO conversion vs. temperature at SV=55K and 165 hr$^{-1}$ using fresh and hydrothermally aged catalyst comprising of 3 grams per cubic platinum and 3 grams per cubic foot palladium.

FIG. 3 shows another plot of CO conversion versus temperature using a catalyst that contains 3 grams per cubic foot of platinum and 3 grams per cubic foot of palladium. The test conditions are presented in Table 3 below.

TABLE 3

Test conditions for CO oxidation

| Species | Concentration |
| --- | --- |
| CO | 1500 ppm |
| NO | 100 ppm |
| H2O | 4% |
| O2 | 14% |
| CO2 | 4% |
| N2 | Balance |
| Hydrocarbons | 500 ppm C1 (mix of C10, C7, C3 and C1) |

The catalyst can be obtained by any means described in the catalyst preparation section above. The catalyst whose testing results are presented in FIG. 3 is obtained by coating and heat treating platinum-palladium metalized slurry on a 400 cells per square inch substrate. The platinum-palladium metallized slurry can be formed by mixing platinum and palladium salts, in this case, platinum and palladium nitrates, and the second component, in this case, —silica-cladded alumina. The quantities of platinum and palladium precursors are chosen such that the final catalyst will have 3 grams per cubic foot palladium and 3 grams per cubic foot platinum in the final catalyst. Fresh and hydrothermally at 700° C. for 20 hrs catalysts had been tested at conditions selected for diesel emission control applications, when hydrocarbons in the reaction gas are comprised of a mixture of decane (C10), toluene (C7), propene (C3) and methane (C1) to have total amount of carbon (C1) in hydrocarbons equal 500 ppm. As can be seen from FIG. 3, such fresh and aged catalyst results in 100% CO conversion at temperatures above 220° C. at SV=55K hr$^{-1}$ and at temperatures above 240° C. at SV=165K hr$^{-1}$.

Example 3

Base Metal Catalysts—Copper Loading Study

Figure 4:
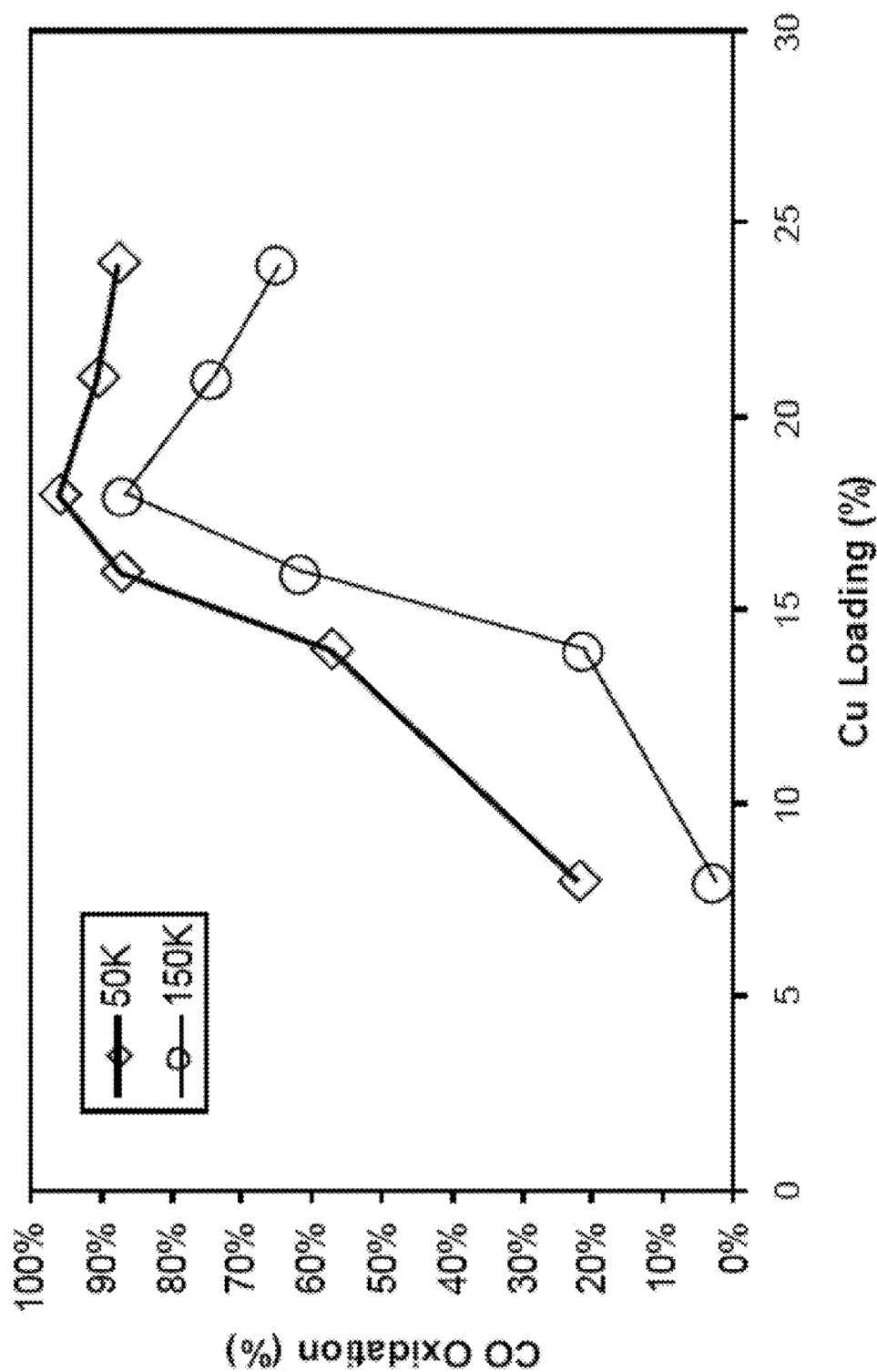
FIG. 4 is a graph depicting CO conversion at 400° C. versus copper loading in grams per liter.

Base metal catalysts comprising of various copper loadings were prepared by impregnation technique as described above. The second component was an oxide material comprising of cerium, zirconium, neodymium and praseodymium in 60:30:5:5 ratio. The catalyst was tested in a gas stream with composition described in Table 2. The results are shown in FIG. 4. In all the cases, the catalyst was coated on a 400 cpsi substrate made from cordierite and the amount of catalyst loading on the substrate remained the same at about 150 g/L. All catalysts were tested at 400° C. for CO oxidation activity at two different space velocities—50,000 hr-1 and 100,000 hr-1. Prior to testing these catalysts, the catalysts were subject to aging for 10 hours using a feed stream comprising of 20 ppm SO$_2$, 10% H2O with balance N2 at 400° C. As can be seen from FIG. 4, samples with copper loading around 16 to 18% show very high activity for CO oxidation, namely over 80%. Above this copper concentration, the CO conversion activity decreased.

Example 4

Copper on Mixed Metal Oxides & Zeolites

Figure 5:
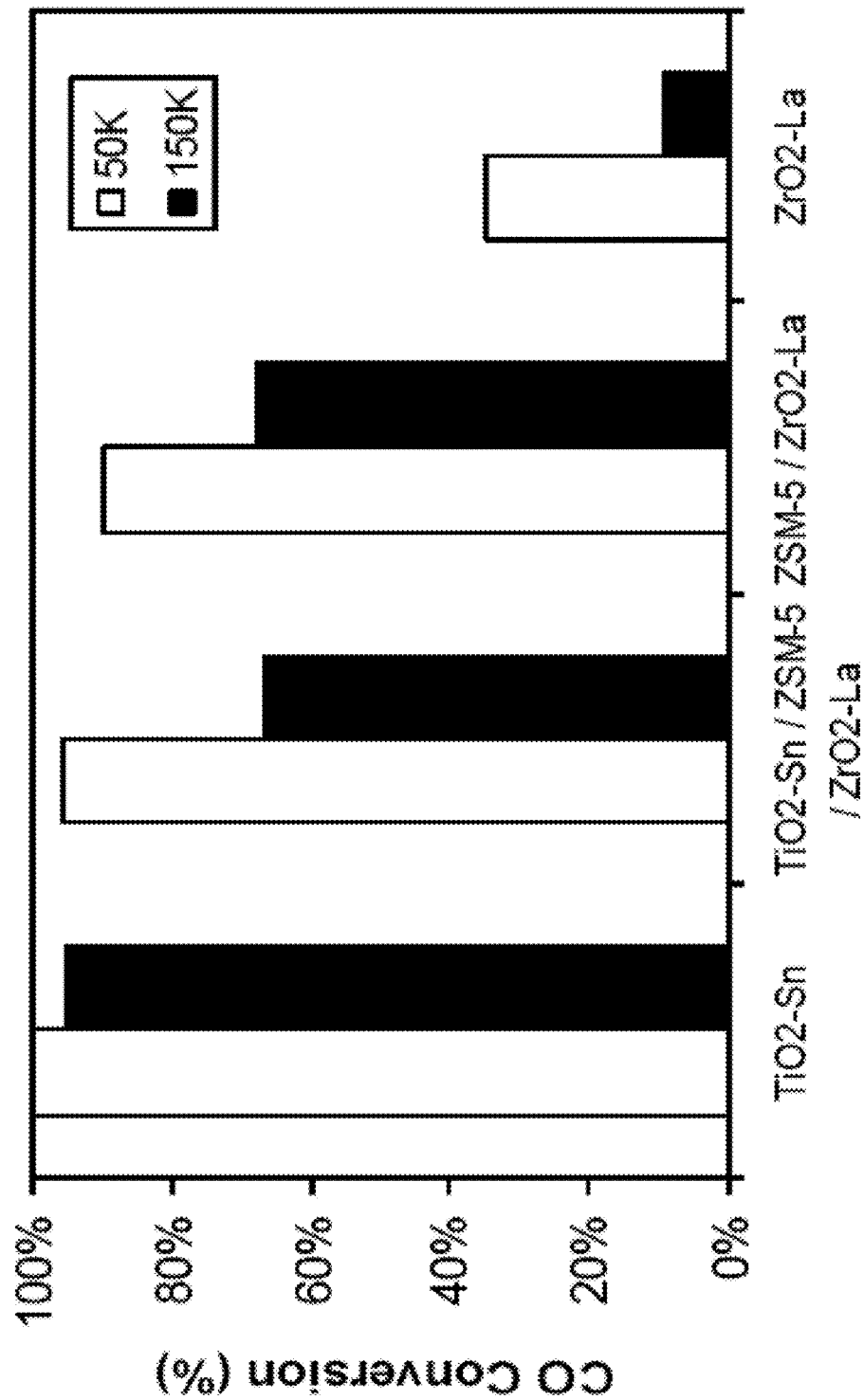
FIG. 5 is a graph depicting CO conversion at 400° C. versus various copper containing catalysts.

Several samples were made with equivalent copper loadings. The samples contain combinations of mixed metal oxides and zeolites. For comparison purposes, copper loaded mixed metal oxides and copper loaded zeolites are also presented. The results are shown in FIG. 5. CO conversion activity was tested on various samples using conditions described in Table 2. Once again samples were aged for 10 hours at 400° C. using a feed stream of 20 ppm SO$_2$, 10% H$_2$O with balance N$_2$ prior to activity testing. As can be seen in FIG. 5, copper containing mixed metal oxide comprising of tin and titania shows very high activity for CO conversion at 50,000 and 100,000 hr-1 space velocities (greater than 90%). On the other hand, copper containing lanthanum-stabilized zirconia had very low CO conversion activity when tested at the same conditions.

Example 5

Effect of Cu Location

Figure 6:
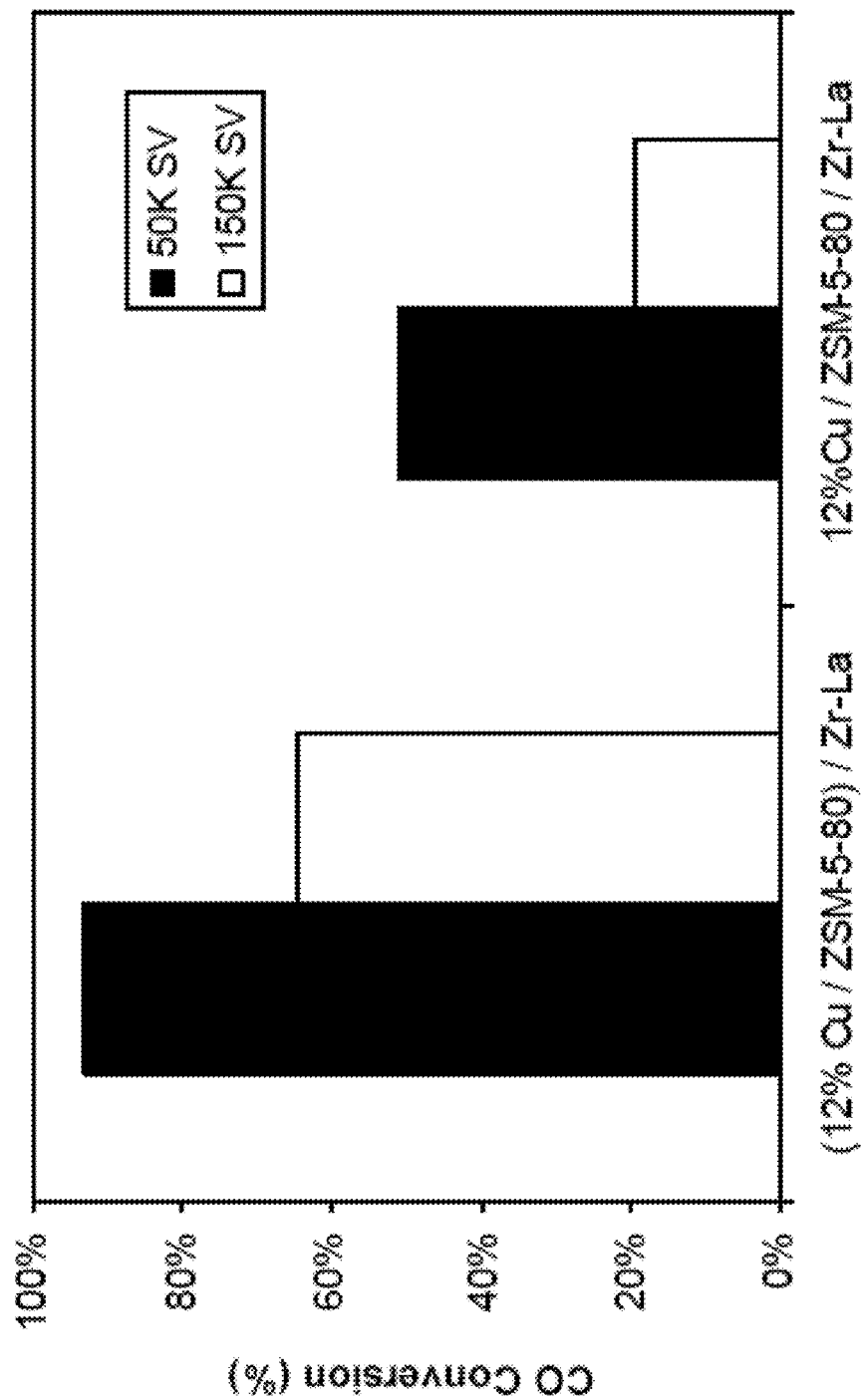
FIG. 6 is a graph depicting CO oxidation at 400° C. versus location of copper in a base metal catalyst.

FIG. 6 shows data on 2 catalyst samples with identical copper loadings. Sample (12% Cu/ZSM-5-80)/Zr-La was prepared by washcoating lanthanum stabilized zirconia and then doping a slurry of 12% Cu/ZSM-5-80 material. The 12% Cu/ZSM-5-80 material was formed by mixing copper nitrate solution and Zeolite ZSM-5-80. In the same plot, CO conversion activity of 12% Cu/ZSM-5-80/Zr-La. This sample was made by washcoating a 50:50 slurry mixture of ZSM-5-80 zeolite and lanthanum stabilized zirconia and then impregnating the catalyst with required amount of copper nitrate solution so that the final result will be 12% copper loaded on such a mixed washcoated catalyst. CO oxidation tests were carried out on both samples using gas stream described in Table 2 after sulfur aging them with 20 ppm SO2, 10% H2O with balance N2 at 400° C. for 10 hours.

As can be seen from the graph, it is advantageous to mix the copper precursor with the zeolite first and then make a slurry of that mixture and coat it on a substrate which contains the lanthanum stabilized zirconia washcoat. A catalyst made in such a way consisting of copper as base metal will result in greater than 90% CO conversion when tested using a feed stream as described in Table 2 above.

Example 6

Other Base Metals and Mixtures of Base Metals

Figure 7:
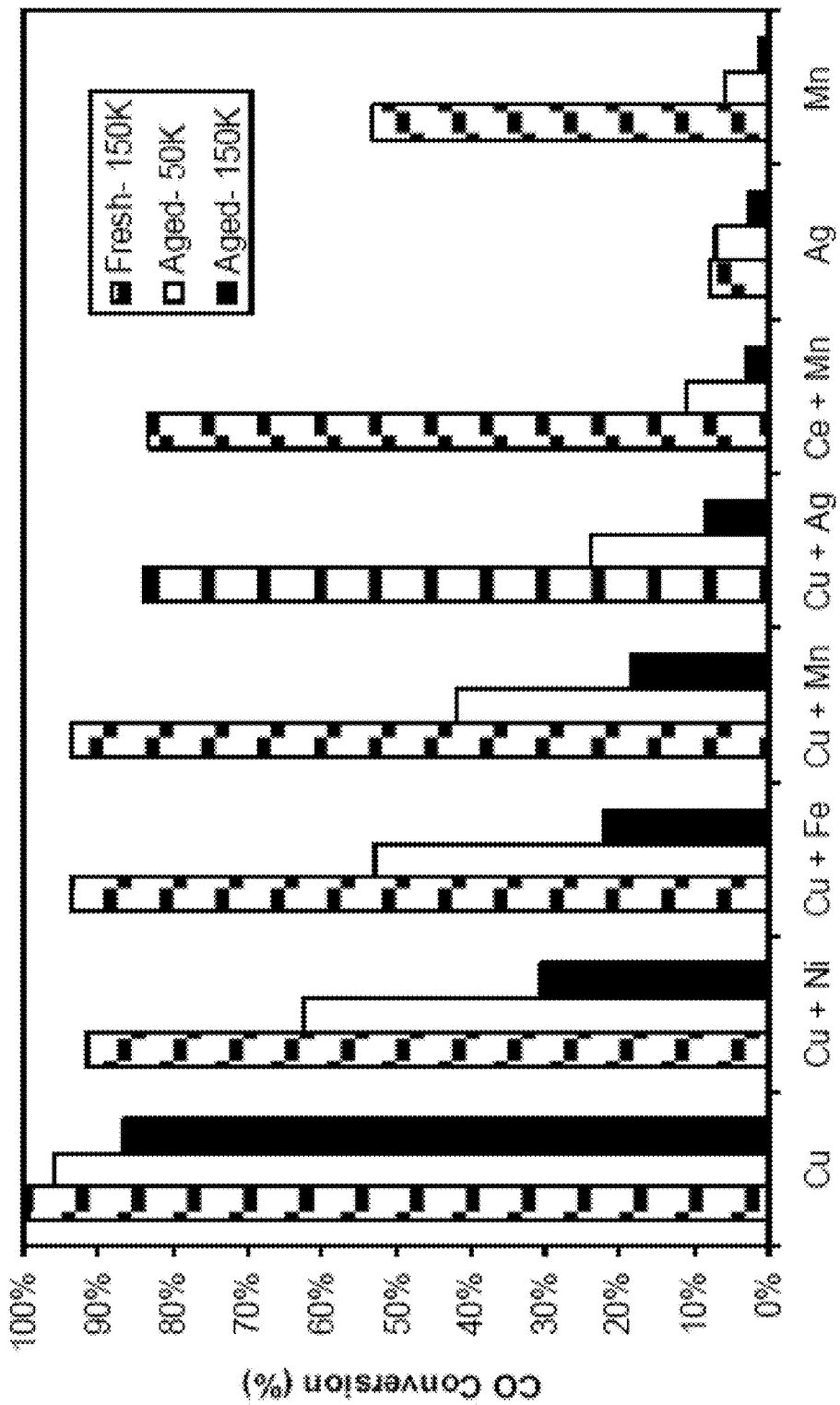
FIG. 7 is a graph depicting CO oxidation at 400° C. versus various base metal loaded catalysts.

FIG. 7 shows the performance of various base metals on a cerium containing oxygen storage material. Catalysts were prepared such that the total base metal concentration on the cerium containing oxygen storage material remains the same. Various catalysts tested were coated catalysts, with coated loadings around 150 g/L. The substrate was identical in all cases and was 400 cpsi. All catalysts were evaluated for CO oxidation activity at 400° C. using a feed stream disclosed in Table 2. The figure includes tests performed using fresh and aged catalysts at various space velocities, wherein the aging was performed at 400° C. for 10 hours using 20 ppm SO$_2$, 10% H$_2$O and balance N$_2$. As can be seen, the results indicate that catalysts containing copper as the base metal out performed other base metals.

Example 7

CO Oxidation by Binary Metal Oxides

Figure 8:
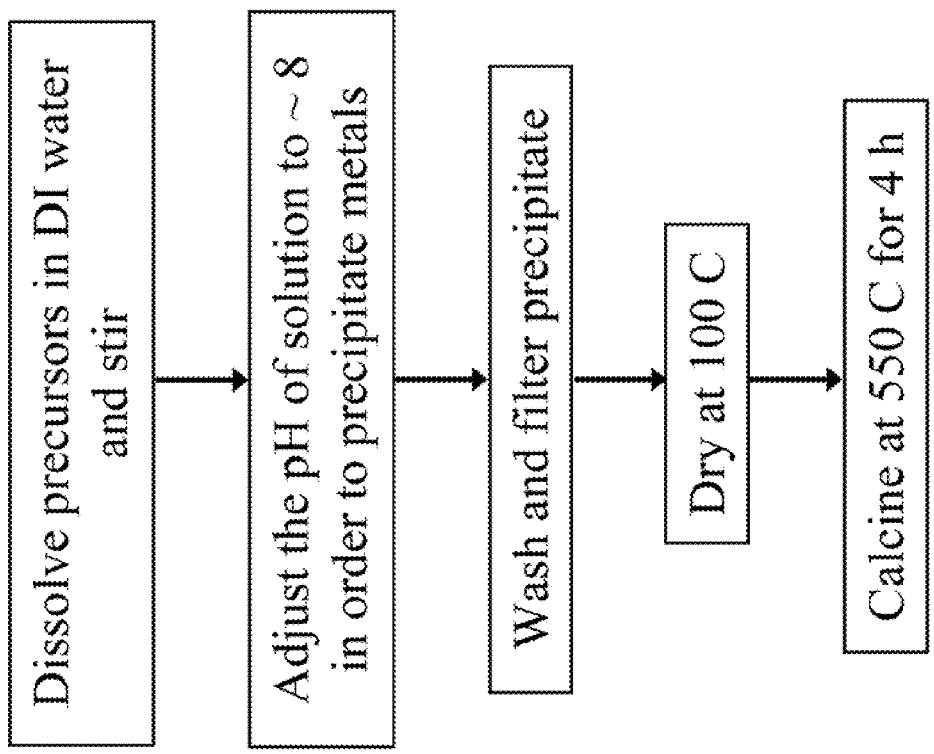
FIG. 8 is a flow chart depicting the process used to create certain binary compositions.
Figure 9:
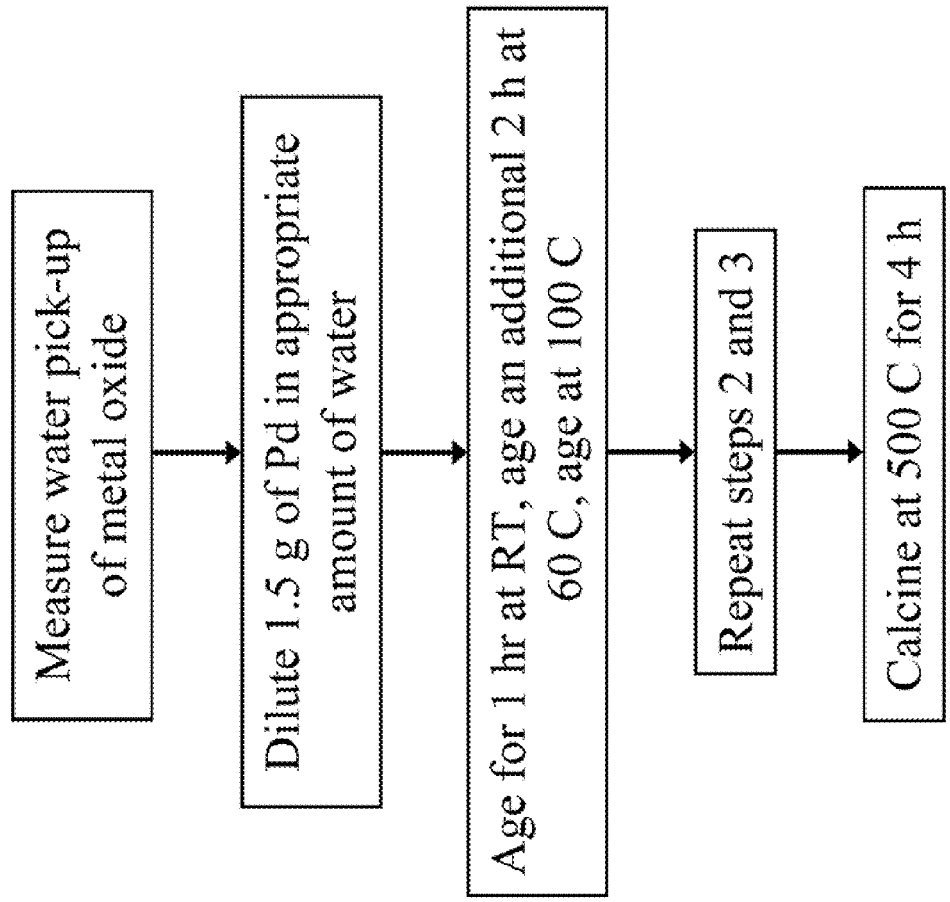
FIG. 9 is a flow chart depicting the process used to measure incipient wetness of certain binary compositions.

Binary Sn—Ti oxides were made and tested for CO oxidation and other properties. CO oxidation was tested over 3% Pd/Sn$_{1-x}$TiO$_2$, where x=0, 0.2, 0.4, 0.6 and 0.8). FIG. 8 shows the synthesis procedure for the binary oxides. The precursors were dissolved in deionized water and stirred. Next, the pH of the solution was adjusted to about 8 in order to precipitate the metals. The precipitate was filtered, washed, and then dried at 100° C. Finally, the precursor was calcined at about 550° C. for about 4 hours. Incipient wetness was tested via the method shown in FIG. 9.

CO reduction reactions were carried out using a fixed bed reactor. Total flow was about 1000 sccm, the stream having about 1500 ppm CO, about 5% CO$_2$, about 10% O$_2$, about 5% H$_2$O and balance N$_2$. The CO conversion was measured and T$_{50}$ was determined for each system. Also, the deactivation of each system over 6 hours at T$_{50}$ was measured. Hydrothermal aging of the catalysts was conducted at about 750° C. for about 16 hours. Table 4 shows a summary of the surface area and activity of each catalyst.

TABLE 4

Surface area and activity of binary oxides

| Composition | 550° C. m²/g | Phase | Aged CO $T_{50}$ (no HC) (° C.) | CO T50 (w/decane) (° C.) |
|---|---|---|---|---|
| $SnO_2$ | 10 | Cassiterite | 121 | 134 |
| $Sn_{0.8}Ti_{0.2}O_2$ | 20 | Rutile | 108.4 | 133 |
| $Sn_{0.6}Ti_{0.4}O_2$ | 36 | Rutile | 116 | 134 |
| $Sn_{0.4}Ti_{0.6}O_2$ | 50 | Rutile | 120 | 138 |
| $Sn_{0.2}Ti_{0.8}O_2$ | 68 | Rutile | 138 | 148 |
| $TiO_2$ | 72 | Ana/Rutile | 146 | 159 |

Each catalyst composition was analyzed using x-ray diffraction (XRD) to detect the crystal structure (phase), crystallite size, surface area, pore volume and % dispersion. Then, the $T_{50}$ for each composition was analyzed fresh and aged using various feed streams. Tables 5-12 show the results of the x-ray diffraction and $T_{50}$ evaluations for the various catalyst compositions.

TABLE 5

XRD of $SnO_2$

| | Un-doped | 3% Pd - Fresh | 3% Pd - HTA Aged |
|---|---|---|---|
| Phases Detected | $SnO_2$ (Cassiterite) | $SnO_2$ (Cassiterite) | $SnO_2$ (Cassiterite) |
| Crystallite Size | >500 nm | >500 nm | >500 nm |
| Surface Area (m²/g) | 6.38 | 5.33 | 4.26 |
| Pore Vol. (cc/g) | 0.03 | 0.04 | 0.03 |
| % Dispersion | N/A | 0.10 | 0.07 |

TABLE 6

Average $T_{50}$ measurements for 3%Pd/$SnO_2$

| | Fresh $T_{50}$ ($T_{90}$-$T_{10}$) | HTA $T_{50}$ ($T_{90}$-$T_{10}$) |
|---|---|---|
| CO only | 164.33° C. | 120.05° C. |
| CO with decane + toluene | 175.29° C. | 166.87° C. |
| CO with decane | 162.42° C. | 133.77° C. |
| CO with toluene | 177.04° C. | 165.64° C. |

TABLE 7

XRD of $TiO_2$

| | Un-doped | 3% Pd - Fresh | 3% Pd - HTA Aged |
|---|---|---|---|
| Phases Detected | Anatase and Rutile | Anatase, Rutile and PdO | Rutile and PdO |
| Crystallite Size | Ti: >500 nm | Ti: >500 nm Pd: 8 nm | Ti: >500 nm Pd: >500 nm |
| Surface Area (m²/g) | 53.7 | 45.1 | 4.39 |
| Pore Vol. (cc/g) | 0.19 | 0.31 | 0.04 |
| % Dispersion | N/A | 5.27 | 0.91 |

TABLE 8

Average $T_{50}$ measurements for 3%Pd/$TiO_2$

| | Fresh | HTA |
|---|---|---|
| CO only | 120.46° C. | 145.56° C. |
| CO with decane + toluene | 159.37° C. | 184.44° C. |
| CO with decane | 151.64° C. | 158.70° C. |
| CO with toluene | 160.72° C. | 185.37° C. |

TABLE 9

Average $T_{50}$ measurements for 3%Pd/$Sn_{0.8}Ti_{0.2}O_2$

| | Fresh | HTA |
|---|---|---|
| CO only | 121.00° C. | 108.41° C. |
| CO with decane + toluene | 160.45° C. | 155.21° C. |
| CO with decane | 133.31° C. | 132.92° C. |
| CO with toluene | 145.24° C. | 156.41° C. |

TABLE 10

Average $T_{50}$ measurements for 3%Pd/$Sn_{0.6}Ti_{0.4}O_2$

| | Fresh | HTA |
|---|---|---|
| CO only | 124.90° C. | 116.49° C. |
| CO with decane + toluene | 155.57° C. | 157.43° C. |
| CO with decane | 135.65° C. | 133.76° C. |
| CO with toluene | 156.90° C. | 158.28° C. |

TABLE 11

Average $T_{50}$ measurements for 3%Pd/$Sn_{0.4}Ti_{0.6}O_2$

| | Fresh | HTA |
|---|---|---|
| CO only | 118.89° C. | 120.21° C. |
| CO with decane + toluene | 153.44° C. | 163.32° C. |
| CO with decane | 137.07° C. | 137.76° C. |
| CO with toluene | 156.09° C. | 161.65° C. |

TABLE 12

Average $T_{50}$ measurements for 3%Pd/$Sn_{0.2}Ti_{0.8}O_2$

| | Fresh | HTA |
|---|---|---|
| CO only | 127.40° C. | 137.89° C. |
| CO with decane + toluene | 162.65° C. | 173.86° C. |

TABLE 12-continued

Average $T_{50}$ measurements for 3%Pd/$Sn_{0.2}Ti_{0.8}O_2$

| | Fresh | HTA |
|---|---|---|
| CO with decane | 143.25° C. | 148.04° C. |
| CO with toluene | 165.51° C. | 174.91° C. |

Example 8

$TiO_2$—$SnO_2$—$ZrO_2$ ternary phase diagram study

Ternary Ti—Sn—Zr oxides were made by dissolving appropriate amounts of $TiOSO_4$, $ZrO(NO_3)_2$ and $SnCl_2$ in deionized water. The hydroxide was precipitated using $NH_4OH$. The resulting precipitate was filtered, washed and dried. Finally, the precipitate was calcined at about 550° C. Tables 13-27 show the compositions and phases detected by x-ray diffraction (XRD). FIGS. 10-17 show the corresponding surface areas measured for selected subsets of compositions.

TABLE 13

Figure 10:
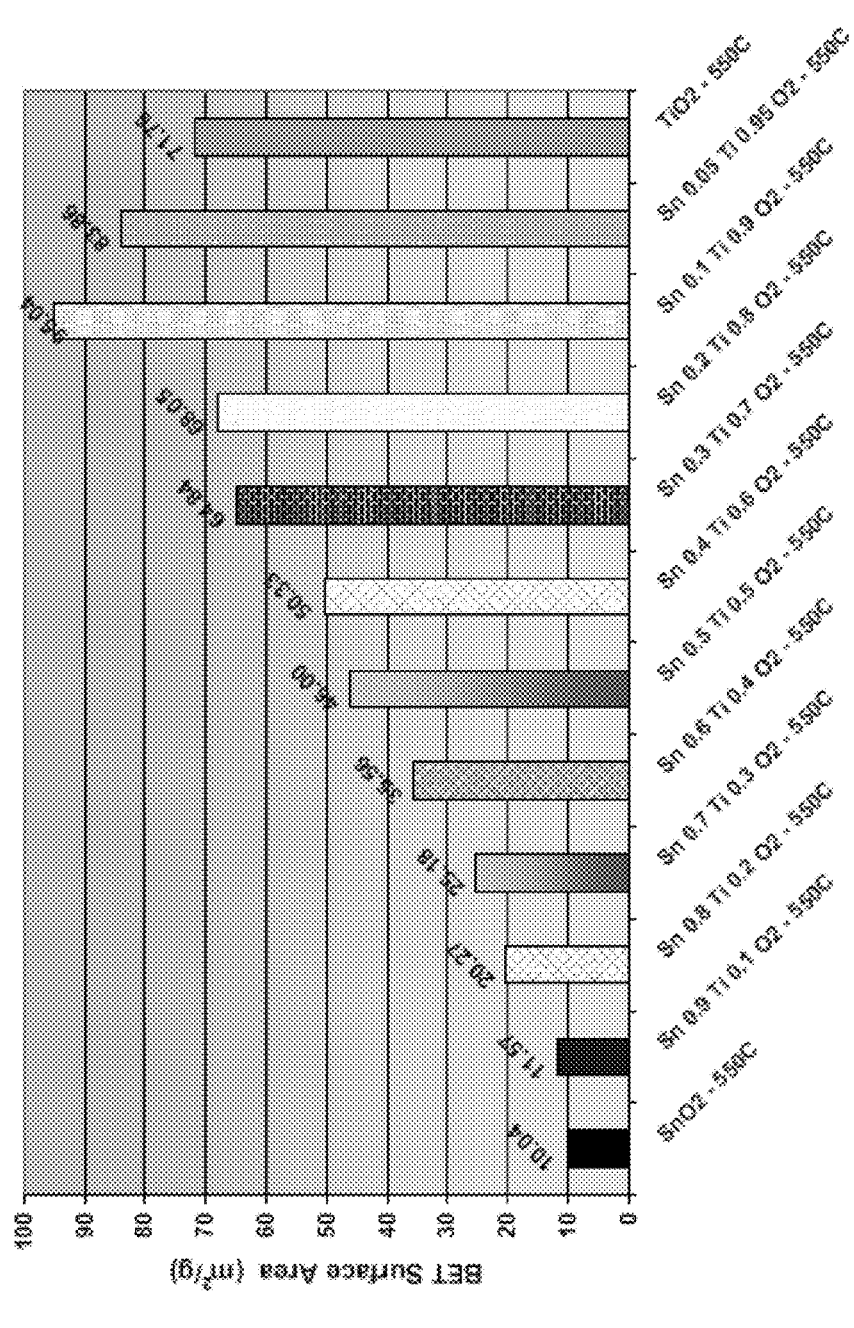
FIG. 10 is a graph depicting the surface area of certain binary compositions.

XRD of $SnO_2$—$TiO_2$ binary composition (See FIG. 10)

| Composition | Phase detected By XRD |
|---|---|
| $SnO_2$ | Cassiterite (rutile) - tetragonal $SnO_2$ |
| $Sn_{0.95}Ti_{0.05}O_2$—$Sn_{0.2}Ti_{0.8}O_2$ | Rutile |
| $Sn_{0.15}Ti_{0.85}O_2$ and $Sn_{0.1}Ti_{0.9}O_2$ | Anatase + Rutile |
| $Sn_{0.05}Ti_{0.95}O_2$ and $TiO_2$ | Anatase |

TABLE 14

Figure 11:
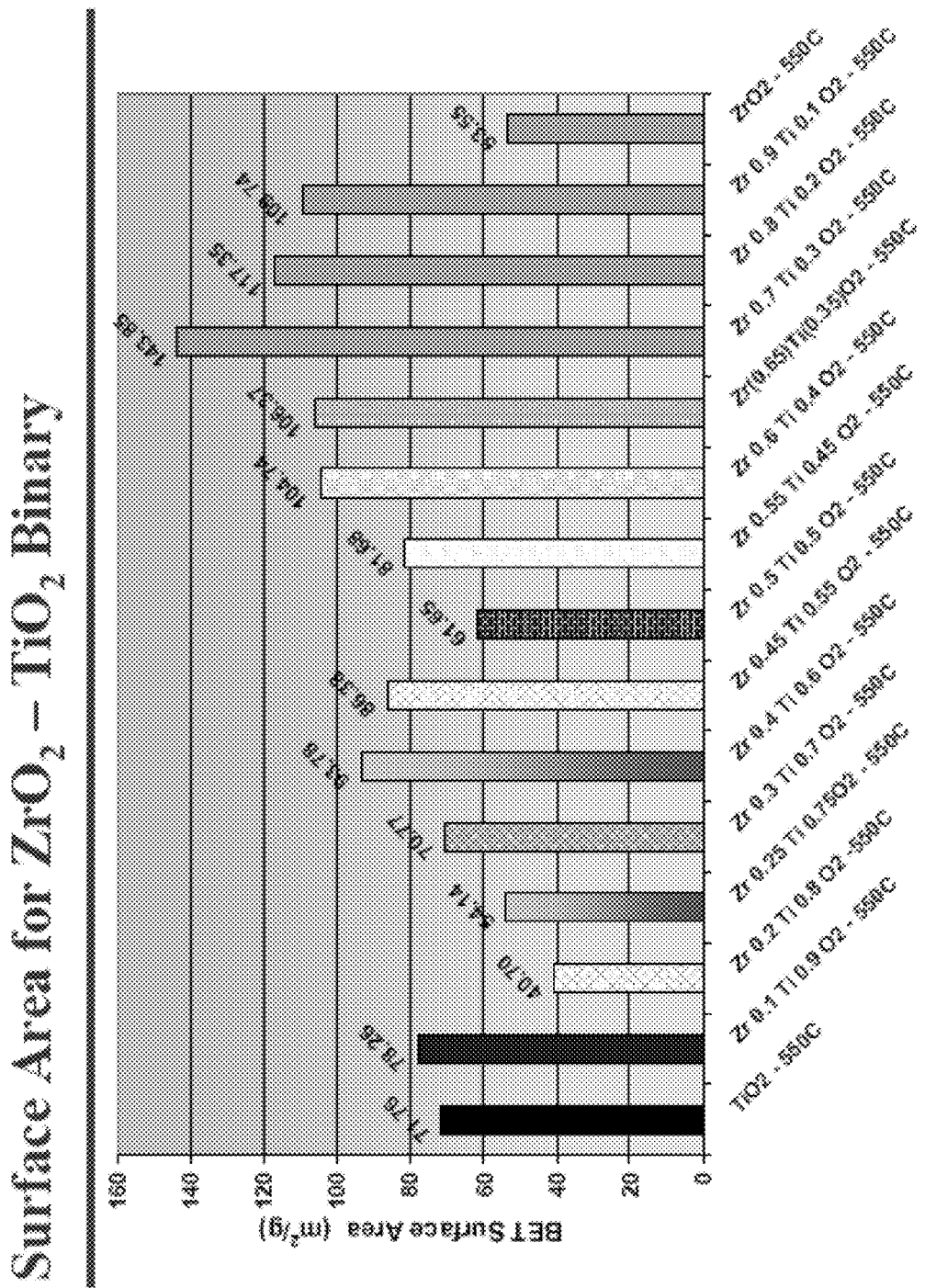
FIG. 11 is a graph depicting the surface area of certain binary compositions.

XRD of $ZrO_2$—$TiO_2$ binary composition (See FIG. 11)

| Composition | Phase detected By XRD |
|---|---|
| $ZrO_2$ | Tetragonal and nionoclinic $ZrO_2$ |
| $Zr_{0.95}Ti_{0.05}O_2$—$Zr_{0.75}Ti_{0.15}O_2$ | Tetragonal $ZrO_2$ + anatase |
| $Zr_{0.7}Ti_{0.3}O_2$—$Zr_{0.45}Ti_{0.55}O_2$ | Tetragonal $ZrO_2$ + anatase + amorphous phase |
| $Zr_{0.4}Ti_{0.6}O_2$—$Zr_{0.1}Ti_{0.9}O_2$ | Anatase + amorphous phase |
| $Zr_{0.05}Ti_{0.95}O_2$ and $TiO_2$ | Anatase |

TABLE 15

Figure 12:
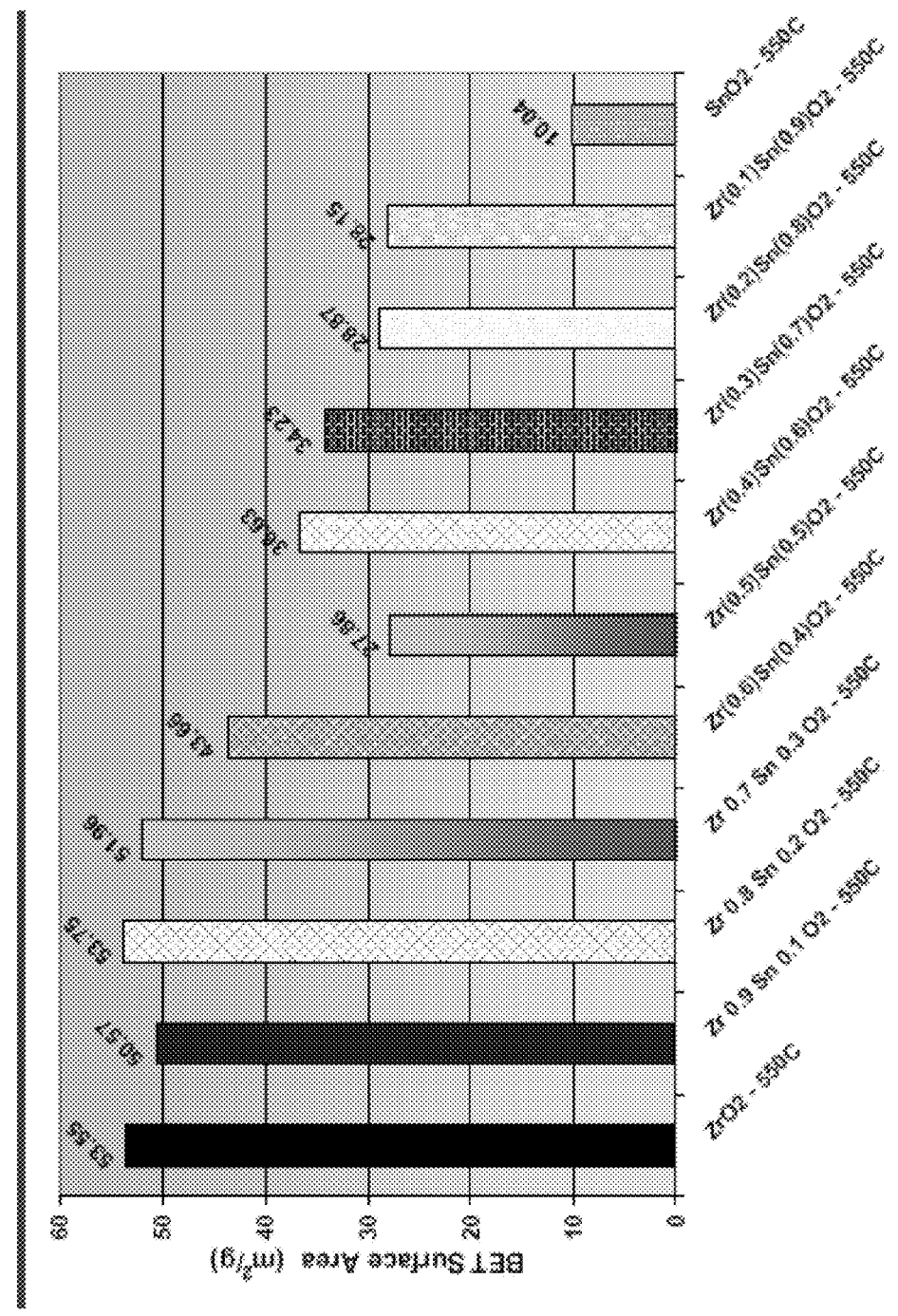
FIG. 12 is a graph depicting the surface area of certain binary compositions.

XRD of $ZrO_2$—$SnO_2$ binary composition (See FIG. 12)

| Composition | Phase detected By XRD |
|---|---|
| $ZrO_2$ and $Zr_{0.95}Sn_{0.05}O_2$ | Tetragonal and monoclinic $ZrO_2$ |
| $Zr_{0.9}Sn_{0.1}O_2$—$Zr_{0.55}Sn_{0.45}O_2$ | Tetragonal $ZrO_2$ + $ZrSnO_4$ |
| $Zr_{0.5}Sn_{0.5}O_2$—$Zr_{0.15}Sn_{0.5}O_2$ | Cassiterite ($SnO_2$) + $ZrSnO_4$ + unidentified peak |
| $Zr_{0.1}Sn_{0.9}O_2$ and $Zr_{0.05}Sn_{0.95}O_2$ | Cassiterite ($SnO_2$) + $ZrSnO_4$ |
| $Zr_{0.05}Sn_{0.95}O_2$ and $SnO_2$ | Cassiterite - tetragonal $SnO_2$ |

TABLE 16

XRD of $Zr_{0.05}Sn_{0.95-x}Ti_xO_2$ ternary composition

| Composition | Phase detected By XRD |
|---|---|
| $Zr_{0.05}Sn_{0.95}O_2$—$Zr_{0.05}Sn_{0.30}Ti_{0.65}O_2$ | Rutile |
| $Zr_{0.05}Sn_{0.25}Ti_{0.7}O_2$—$Zr_{0.05}Sn_{0.1}Ti_{0.85}O_2$ | Rutile + anatase |
| $Zr_{0.05}Sn_{0.05}Ti_{0.9}O_2$ | Anatase + Rutile |
| $Zr_{0.05}Ti_{0.95}O_2$ | Anatase |

TABLE 17

Figure 13:
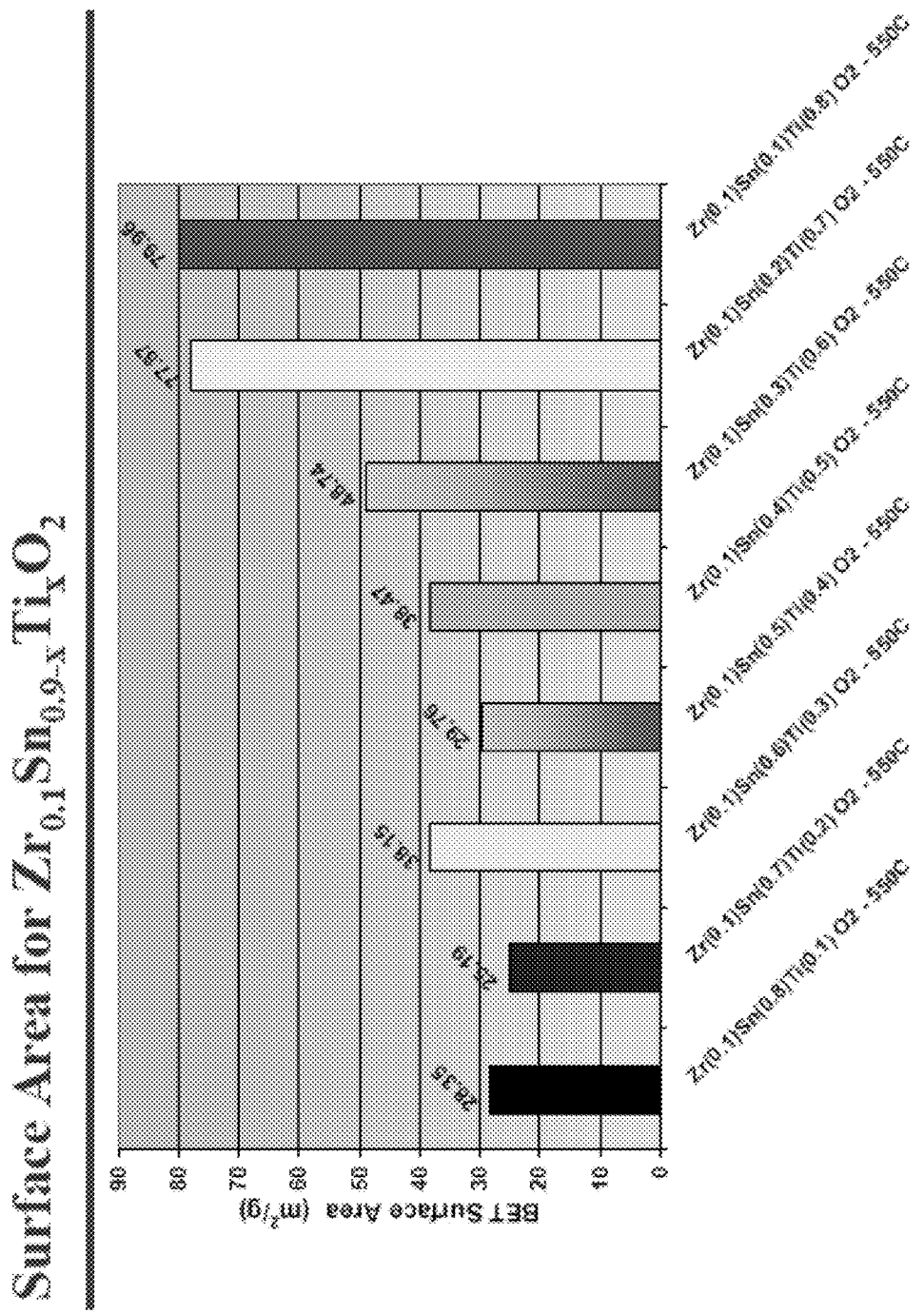
FIG. 13 is a graph depicting the surface area of certain ternary compositions.

XRD of $Zr_{0.1}Sn_{0.9-x}Ti_xO_2$ ternary composition (See FIG. 13)

| Composition | Phase detected By XRD |
|---|---|
| $Zr_{0.1}Sn_{0.9}O_2$—$Zr_{0.1}Sn_{0.55}Ti_{0.35}O_2$ | Rutile + $ZrSnO_4$ |
| $Zr_{0.1}Sn_{0.5}Ti_{0.4}O_2$—$Zr_{0.1}Sn_{0.2}Ti_{0.7}O_2$ | Rutile + $ZrSn_{0.5}Ti_{0.5}O_4$ |
| $Zr_{0.1}Sn_{0.15}Ti_{0.75}O_2$—$Zr_{0.1}Sn_{0.05}Ti_{0.85}O_2$ | Rutile + $ZrSn_{0.5}Ti_{0.5}O_4$ + anatase |
| $Zr_{0.1}Ti_{0.9}O_2$ | Anatase + amorphous phase |

TABLE 18

XRD of $Zr_{0.15}Sn_{0.85-x}Ti_xO_2$ ternary composition

| Composition | Phase detected By XRD |
|---|---|
| $Zr_{0.15}Sn_{0.85}O_2$—$Zr_{0.15}Sn_{0.50}Ti_{0.35}O_2$ | Rutile + $ZrSnO_4$ |
| $Zr_{0.15}Sn_{0.45}Ti_{0.4}O_2$—$Zr_{0.15}Sn_{0.2}Ti_{0.65}O_2$ | Rutile + $ZrSn_{0.5}Ti_{0.5}O_4$ |
| $Zr_{0.15}Sn_{0.15}Ti_{0.7}O_2$—$Zr_{0.15}Sn_{0.1}Ti_{0.75}O_2$ | Anatase + Rutile + $ZrSn_{0.5}Ti_{0.5}O_4$ |
| $Zr_{0.15}Sn_{0.05}Ti_{0.8}O_2$—$Zr_{0.15}Ti_{0.85}O_2$ | Anatase + Amorphous phase |

TABLE 19

Figure 14:
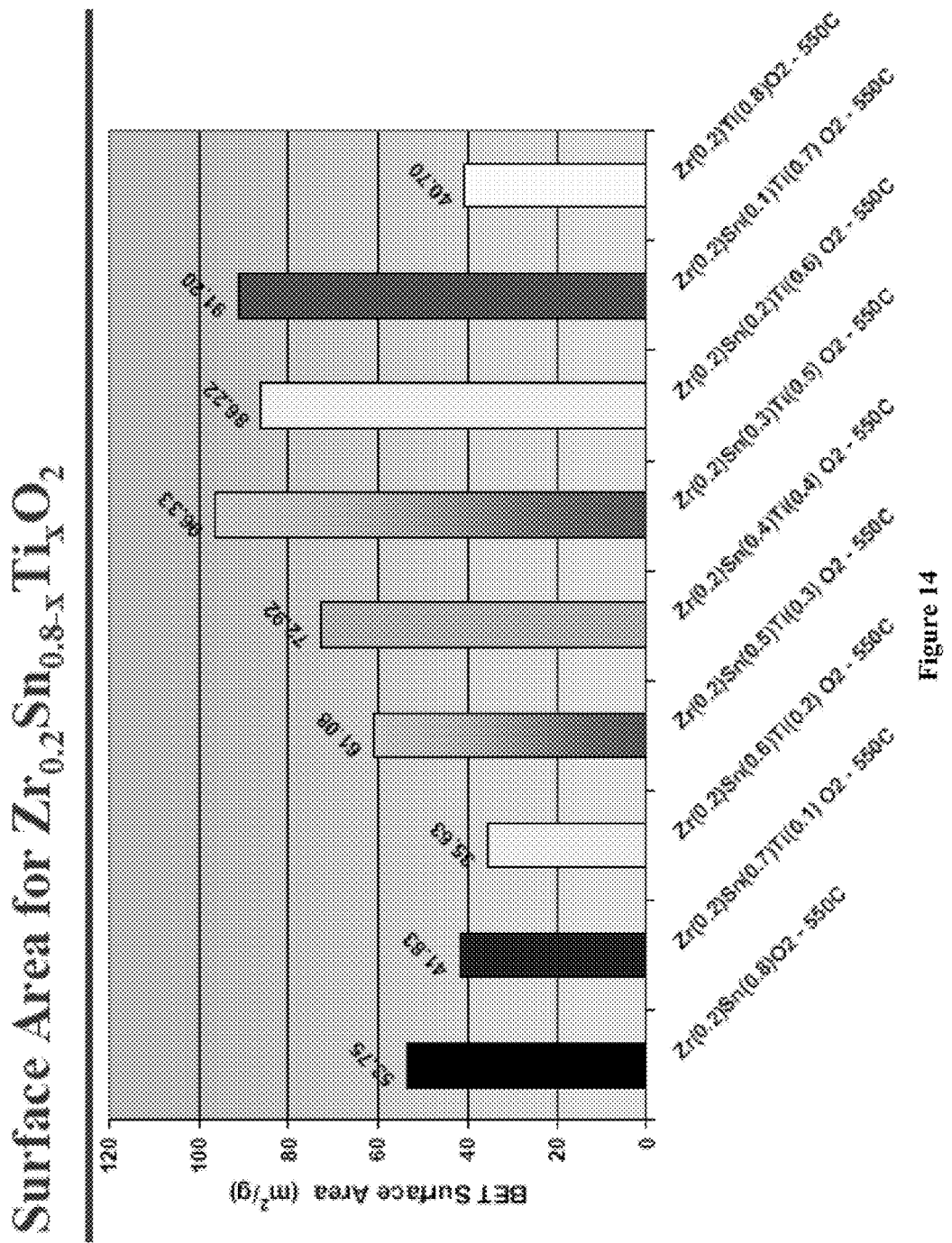
FIG. 14 is a graph depicting the surface area of certain ternary compositions.

XRD of $Zr_{0.2}Sn_{0.8-x}Ti_xO_2$ ternary composition (See FIG. 14)

| Composition | Phase detected By XRD |
|---|---|
| $Zr_{0.2}Sn_{0.8}O_2$—$Zr_{0.2}Sn_{0.5}Ti_{0.3}O_2$ | Rutile + $ZrSnO_4$ |
| $Zr_{0.2}Sn_{0.45}Ti_{0.35}O_2$—$Zr_{0.2}Sn_{0.15}Ti_{0.65}O_2$ | Rutile + $ZrSn_{0.5}Ti_{0.5}O_4$ |
| $Zr_{0.2}Sn_{0.1}Ti_{0.7}O_2$—$Zr_{0.2}Sn_{0.05}Ti_{0.75}O_2$ | Rutile + $ZrSn_{0.5}Ti_{0.5}O_4$ + anatase |
| $Zr_{0.2}Ti_{0.8}O_2$ | Anatase + amorphous phase |

TABLE 20

XRD of $Zr_{0.25}Sn_{0.75-x}Ti_xO_2$ ternary composition

| Composition | Phase detected By XRD |
|---|---|
| $Zr_{0.25}Sn_{0.75}O_2$—$Zr_{0.25}Sn_{0.45}Ti_{0.3}O_2$ | Rutile + $ZrSnO_4$ |
| $Zr_{0.25}Sn_{0.4}Ti_{0.35}O_2$—$Zr_{0.25}Sn_{0.25}Ti_{0.5}O_2$ | Rutile + $ZrSn_{0.5}Ti_{0.5}O_4$ |
| $Zr_{0.25}Sn_{0.2}Ti_{0.55}O_2$—$Zr_{0.25}Sn_{0.1}Ti_{0.65}O_2$ | Anatase + Rutile + $ZrSn_{0.5}Ti_{0.5}O_4$ |
| $Zr_{0.25}Sn_{0.05}Ti_{0.7}O_2$—$Zr_{0.25}Ti_{0.75}O_2$ | Anatase + Amorphous phase |

TABLE 21

Figure 15:
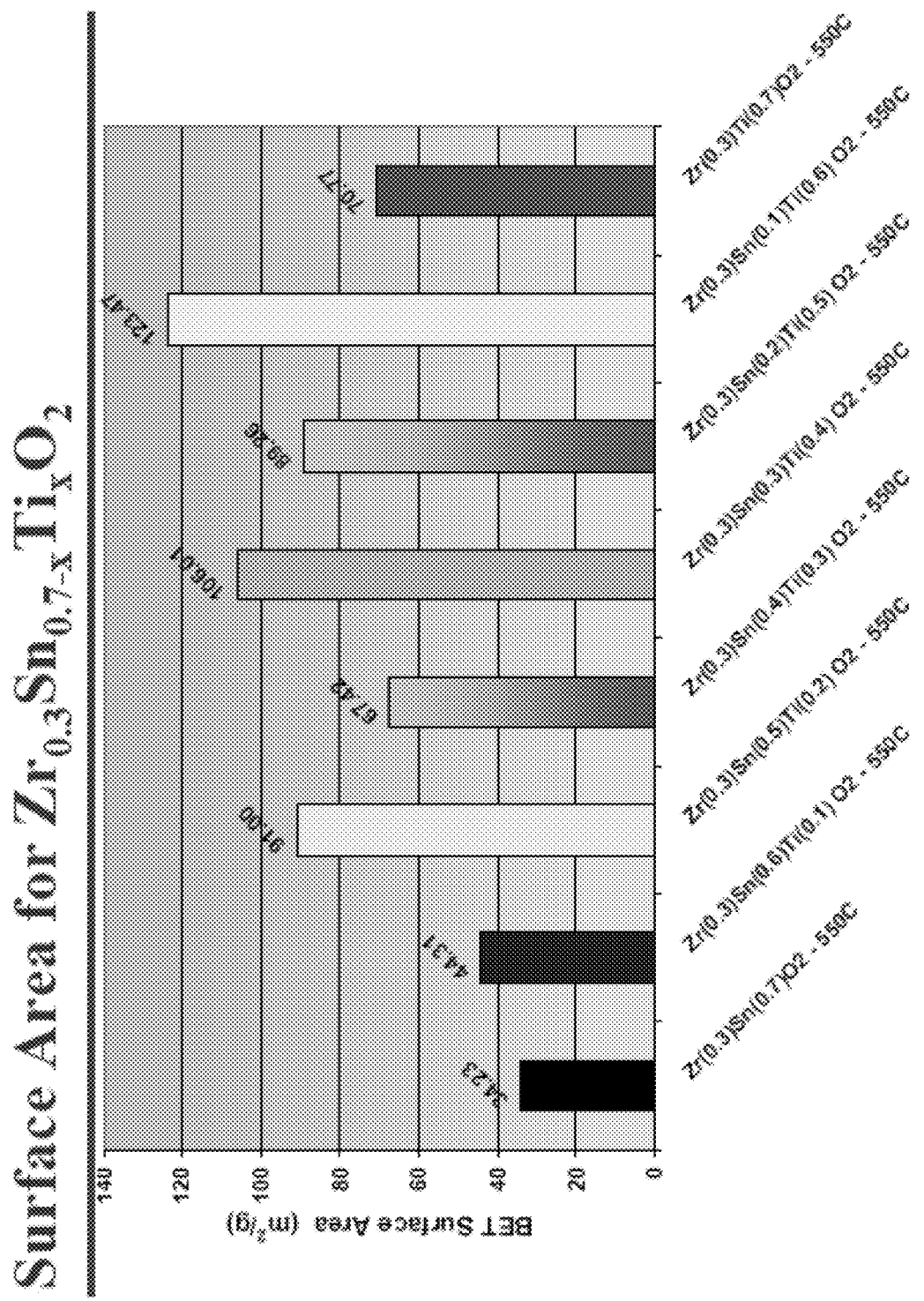
FIG. 15 is a graph depicting the surface area of certain ternary compositions.

XRD of $Zr_{0.3}Sn_{0.7-x}Ti_xO_2$ ternary composition (See FIG. 15)

| Composition | Phase detected By XRD |
|---|---|
| $Zr_{0.3}Sn_{0.7}O_2$—$Zr_{0.3}Sn_{0.65}Ti_{0.05}O_2$ | Rutile + $ZrSnO_4$ |
| $Zr_{0.3}Sn_{0.6}Ti_{0.1}O_2$—$Zr_{0.3}Sn_{0.35}Ti_{0.35}O_2$ | Rutile + $ZrSnO_4$ + $ZrSn_{0.5}Ti_{0.5}O_4$ |

TABLE 21-continued

XRD of $Zr_{0.3}Sn_{0.7-x}Ti_xO_2$ ternary composition (See FIG. 15)

| Composition | Phase detected By XRD |
|---|---|
| $Zr_{0.3}Sn_3Ti_{0.4}O_2$—$Zr_{0.3}Sn_{0.1}Ti_{0.6}O_2$ | Rutile + $ZrSn_{0.5}Ti_{0.5}O_4$ |
| $Zr_{0.3}Sn_{0.05}Ti_{0.65}O_2$ | Amorphous phase |
| $Zr_{0.3}Ti_{0.7}O_2$ | Anatase + amorphous phase |

TABLE 22

XRD of $Zn_{0.35}Sn_{0.65-x}Ti_xO_2$ ternary composition

| Composition | Phase detected By XRD |
|---|---|
| $Zr_{0.35}Sn_{0.65}O_2$—$Zr_{0.35}Sn_{0.6}Ti_{0.05}O_2$ | Rutile + $ZrSnO_4$ |
| $Zr_{0.35}Sn_{0.55}Ti_{0.1}O_2$—$Zr_{0.35}Sn_{0.15}Ti_{0.5}O_2$ | Rutile + $ZrSn_{0.5}Ti_{0.5}O_4$ |
| $Zr_{0.35}Sn_{0.1}Ti_{0.55}O_2$ | Anatase + Rutile + $ZrTiO_4$ |
| $Zr_{0.35}Sn_{0.1}Ti_{0.55}O_2$—$Zr_{0.35}Sn_{0.1}Ti_{0.55}O_2$ | Anatase + $ZrTiO_4$ |
| $Zr_{0.35}Ti_{0.65}O_2$ | Anatase + Amorphous phase |

TABLE 23

Figure 16:
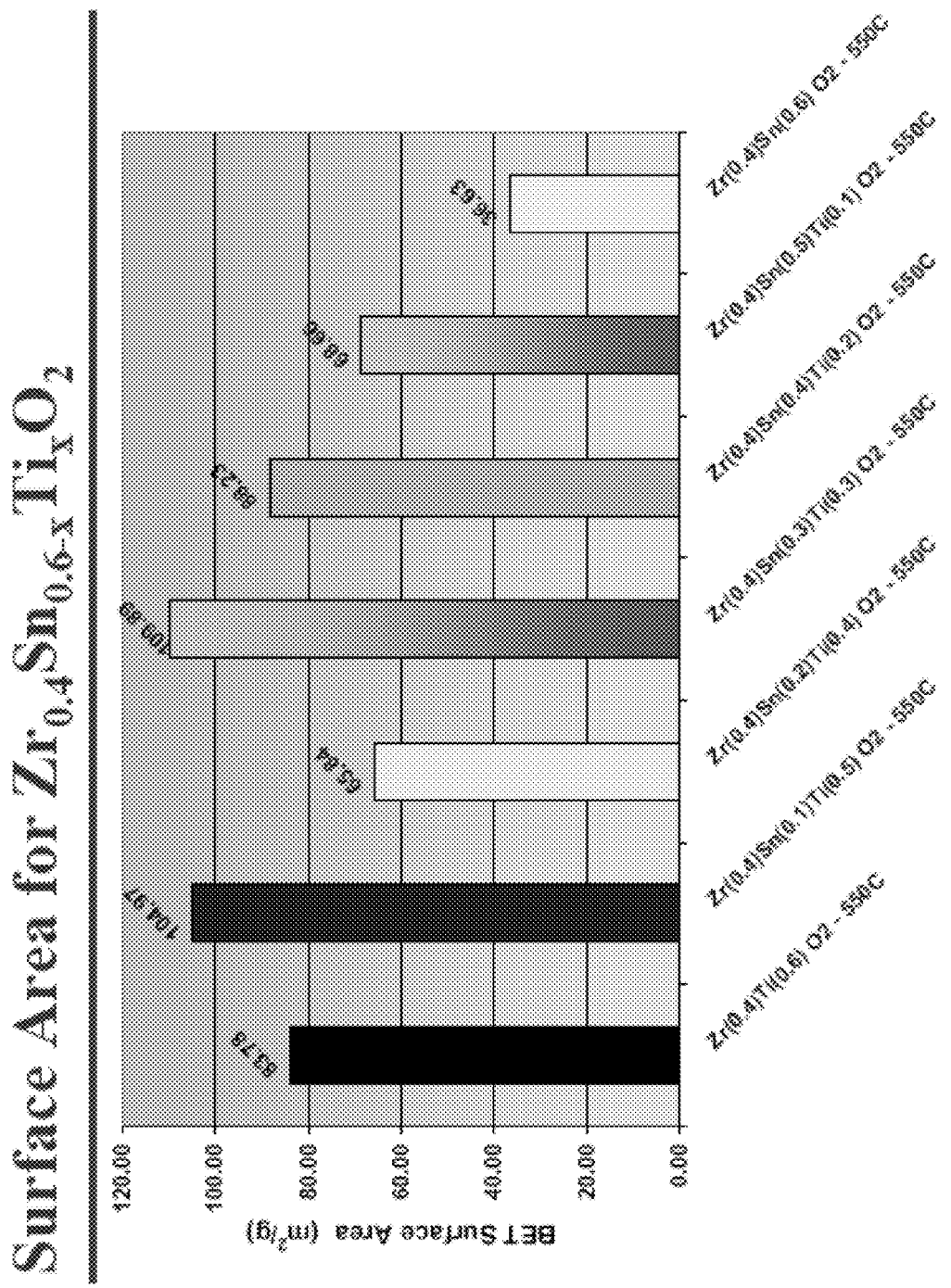
FIG. 16 is a graph depicting the surface area of certain ternary compositions.

XRD of $Zr_{0.4}Sn_{0.6-x}Ti_xO_2$ ternary composition (See FIG. 16)

| Composition | Phase detected By XRD |
|---|---|
| $Zr_{0.4}Sn_{0.6}O_2$—$Zr_{0.4}Sn_{0.3}Ti_{0.3}O_2$ | Rutile + $ZrSnO_4$ |
| $Zr_{0.4}Sn_{0.25}Ti_{0.35}O_2$ | Rutile + $ZrSn_{0.5}Ti_{0.5}O_4$ |
| $Zr_{0.4}Sn_{0.2}Ti_{0.4}O_2$—$Zr_{0.4}Sn_{0.1}Ti_{0.6}O_2$ | Rutile + $ZrSn_{0.5}Ti_{0.5}O_4$ + Anatase |
| $Zr_{0.4}Sn_{0.05}Ti_{0.65}O_2$—$Zr_{0.4}Ti_{0.6}O_2$ | Anatase + amorphous phase |

TABLE 24

XRD of $Zr_{0.45}Sn_{0.55-x}Ti_xO_2$ ternary composition

| Composition | Phase detected By XRD |
|---|---|
| $Zr_{0.45}Sn_{0.55}O_2$—$Zr_{0.45}Sn_{0.25}Ti_{0.3}O_2$ | Rutile + $ZrSnO_4$ |
| $Zr_{0.45}Sn_{0.2}Ti_{0.35}O_2$—$Zr_{0.45}Sn_{0.15}Ti_{0.4}O_2$ | Rutile + $ZrSn_{0.5}Ti_{0.5}O_4$ + Anatase |
| $Zr_{0.45}Sn_{0.1}Ti_{0.45}O_2$ | Anatase + Amorphous phase |
| $Zr_{0.45}Sn_{0.05}Ti_{0.5}O_2$ | Amorphous phase |
| $Zr_{0.45}Ti_{0.55}O_2$ | Anatase + Amorphous phase |

TABLE 25

XRD of $Zr_{0.8}Sn_{0.2-x}Ti_xO_2$ ternary composition

| Composition | Phase detected By XRD |
|---|---|
| $Zr_{0.8}Sn_{0.2}O_2$ | Tetragonal $ZrO_2$ + $ZrSnO_4$ |
| $Zr_{0.8}Sn_{0.15}Ti_{0.05}O_2$—$Zr_{0.8}Ti_{0.2}O_2$ | Tetragonal $ZrO_2$ + anatase |

SA for $Zr_{0.8}Sn_{0.1}Ti_{0.1}O_2$: 87.70 m$^2$/g

TABLE 26

XRD of $Zr_{0.85}Sn_{0.15-x}Ti_xO_2$ ternary composition

| Composition | Phase detected By XRD |
|---|---|
| $Zr_{0.85}Sn_{0.15}O_2$ | Tetragonal $ZrO_2$ + $ZrSnO_4$ |
| $Zr_{0.85}Sn_{0.10}Ti_{0.05}O_2$—$Zr_{0.85}Ti_{0.15}O_2$ | Tetragonal $ZrO_2$ + anatase |

TABLE 27

XRD of $Zr_{0.9}Sn_{0.1-x}Ti_xO_2$ ternary composition

| Composition | Phase detected By XRD |
|---|---|
| $Zr_{0.9}Sn_{0.1}O_2$ | Tetragonal $ZrO_2$ + $ZrSnO_4$ |
| $Zr_{0.9}Sn_{0.05}Ti_{0.05}O_2$ | Tetragonal and monoclinic $ZrO_2$ |
| $Zr_{0.9}Ti_{0.1}O_2$ | Tetragonal $ZrO_2$ + anatase |

We claim:

1. A method for the conversion of CO in an exhaust stream, comprising: contacting an exhaust stream containing CO with a catalyst, the catalyst made from the addition of a Sn compound is a ternary composition comprising Sn, Ti and Zr, wherein the ternary composition comprises $Sn_{(a)}Ti_{(b)}Zr_{(c)}O_2$, wherein a is 0.25, b is 0.25 and c is 0.5.

2. The method of claim 1, wherein the ternary composition comprises a srilankite crystal phase.

3. A method for the conversion of CO in an exhaust stream, comprising: contacting an exhaust stream containing CO with a catalyst, the catalyst comprising a Sn compound selected from the group consisting of a binary composition comprising Sn and Ti, and a ternary composition comprising Sn, Ti and Zr, and mixtures of any thereof, wherein the Sn compound comprises a composition defined by a region of a phase diagram between $Zr_{0.5}Sn_{0.25}Ti_{0.25}O_2$ and, $Sn_{1-x}Ti_xO_2$, where x is greater than or equal to 0 and less than 0.85; the catalyst further comprising a catalyst component selected from the group consisting of Pt, Pd, one or more base metals, and combinations of any thereof, wherein the base metal is selected from the group consisting of Cu, Fe, Ni, W, V, Cr, Mn, Co, and mixtures of any thereof.

4. A method for the conversion of CO in an exhaust stream according to claim 3, wherein the binary composition comprises $Sn_{(x)}Ti_{(y)}O_2$, wherein x+y=1, 0.85>y>0.

5. The method of claim 4, wherein 0.5>y>0.05.

6. The method of claim 4, wherein the binary composition comprises a rutile crystal phase.

7. The method of claim 3, wherein x is greater than or equal to 0.05 and less than 0.85.

8. The method of claim 3, wherein the Sn compound comprises a composition defined by a region of a phase diagram between $Zr_{0.5}Sn_{0.25}T_{0.25}O_2$ and rutile $Sn_{1-x}Ti_xO_2$ where 0.05<x<0.85, comprising: $Zr_aSn_bTi_c$, where a, b and c comprise:

a=0.5, b=0.25, c=0.25;
a=0.4, 0.23<b<0.39, 0.21<c<0.37; where b+c=0.6;
a=0.3, 0.21<b<0.53, 0.17<c<0.49; where b+c=0.7;
a=0.2, 0.19<b<0.67, 0.13<c<0.61; where b+c=0.8;
a=0.1, 0.17<b<0.81, 0.09<c<0.73; where b+c=0.9;
a=0, 0.15<b<0.95, 0.05<c<0.85; where b+c=1.0;
and all intermediate regions between a=0 and a=0.5.

9. A method for the conversion of CO in an exhaust stream according to claim 3, wherein the catalyst is on a substrate.

10. The method of claim 9, wherein the substrate comprises a ceramic support.

11. The method of claim 10, wherein the ceramic support comprises a material selected from the group consisting of cordierite and silicon carbide.

12. The method of claim 11, wherein the substrate comprises a particulate filter.

13. The method of claim 12, wherein the particulate filter comprises a wall flow filter.

14. The method of claim 13, wherein the particulate filter comprises a diesel particulate filter.

15. A method for the conversion of CO in an exhaust stream, comprising: contacting an exhaust stream containing CO with a catalyst, the catalyst comprising a Sn compound selected from the group consisting of a binary composition comprising Sn and Ti, and a ternary composition comprising Sn, Ti and Zr, and mixtures of any thereof, the catalyst further comprising a component selected from the group consisting of Pt, Pd, one or more base metals, and combinations of any thereof, wherein the base metal is selected from the group consisting of Cu, Fe, Ni, W, V, Cr, Mn, Co, and mixtures of any thereof.

16. The method of claim 15, wherein the catalyst comprises Pd.

17. The method of claim 16, wherein Sn compound comprises the binary compound comprising $Sn_{1-x}Ti_xO_2$, wherein $0.5>x>0.05$.

18. A method for the conversion of CO in an exhaust stream, comprising: contacting an exhaust stream containing CO with a catalyst, the catalyst comprising a Sn compound selected from the group consisting of a binary composition comprising Sn and Ti, and a ternary composition comprising Sn, Ti and Zr, and mixtures of any thereof, wherein the catalyst further comprises a zeolite.

19. The method of claim 18, wherein the zeolite is selected from the group consisting of ZSM-5, ZSM-11, ZSM-12, ZSM-18, ZSM-23, MCM-zeolites, mordenite, faujasite, ferrierite, zeolite beta, and mixtures thereof.

* * * * *